US012619699B1

(12) United States Patent
Rihani et al.

(10) Patent No.: US 12,619,699 B1
(45) Date of Patent: May 5, 2026

(54) CREDENTIAL ISSUING POOLS IN A DECENTRALIZED NETWORK

(71) Applicant: Block, Inc., Oakland, CA (US)

(72) Inventors: Michael Rihani, Palo Alto, CA (US); Alice Chen, San Jose, CA (US); Daniel Buchner, Austin, TX (US); Jonathan Blackwell, Santa Monica, CA (US); Moiz Jangda, Austin, TX (US)

(73) Assignee: Block, Inc., Oakland, CA (US)

( * ) Notice: Subject to any disclaimer, the term of this patent is extended or adjusted under 35 U.S.C. 154(b) by 73 days.

(21) Appl. No.: 18/404,692

(22) Filed: Jan. 4, 2024

(51) Int. Cl.
G06F 21/33 (2013.01)
G06F 21/40 (2013.01)
G06Q 20/40 (2012.01)

(52) U.S. Cl.
CPC .............. G06F 21/33 (2013.01); G06F 21/40 (2013.01); G06Q 20/4014 (2013.01); G06Q 20/4016 (2013.01)

(58) Field of Classification Search
CPC ................................................ G06F 21/30–46
See application file for complete search history.

(56) References Cited

U.S. PATENT DOCUMENTS

| | | | | |
|---|---|---|---|---|
| 2002/0144149 | A1* | 10/2002 | Hanna | H04L 9/3263 |
| | | | | 726/5 |
| 2019/0281036 | A1* | 9/2019 | Eisen | G06F 21/31 |
| 2022/0122170 | A1* | 4/2022 | Du | H04L 9/0869 |
| 2022/0365922 | A1* | 11/2022 | Kofman | G06F 16/2365 |
| 2023/0224309 | A1* | 7/2023 | Puri | G06Q 20/38215 |
| | | | | 726/21 |

\* cited by examiner

*Primary Examiner* — Jay Huang

(74) *Attorney, Agent, or Firm* — IP Spring

(57) ABSTRACT

Technologies are described herein for improvements in the security of verifiable credentials. A method can include requesting, by a first decentralized identifier (DID) associated with a decentralized web node (DWN), a verifiable credential from a second DID, wherein the second DID is included in a pool of DIDs. The method also includes receiving, from the pool of DIDs and by the first DID, the verifiable credential. The method also includes receiving, from a third DID and at the first DID, a request to verify information associated with the first DID. The method also includes determining, at the DWN, that the verifiable credential includes the information requested by the third DID. The method also includes presenting, by the DWN, at least a portion of the verifiable credential to the third DID in response to determining that the verifiable credential includes the information.

20 Claims, 14 Drawing Sheets

100

300

Pool of Decentralized Identifiers 118

400

500

505
Select which details you want to share for your application to participate in the clinical trial

| Confirmation of illness X 515 | ☑ |

| ID 012345678 520 | ☐ |

| Birthday: 01/01/2001 525 | ☑ |

| Medication: PlaceboX 530 | ☑ |

| Email: First.Last@Email.com 535 | ☐ |

| Pool name: United Hospitals Inc. 540 | ☑ |

| Trustworthiness Score: 98 545 | ☑ |

( Next 550 )

| Credentials 507 | Scan Docs 509 | DIDs 511 |

550

Confirmation of illness X 555

Birthday: 01/01/2001 560

Medication: PlaceboX 565

Pool name: United Hospitals Inc. 570

Trustworthiness Score: 98 575

600

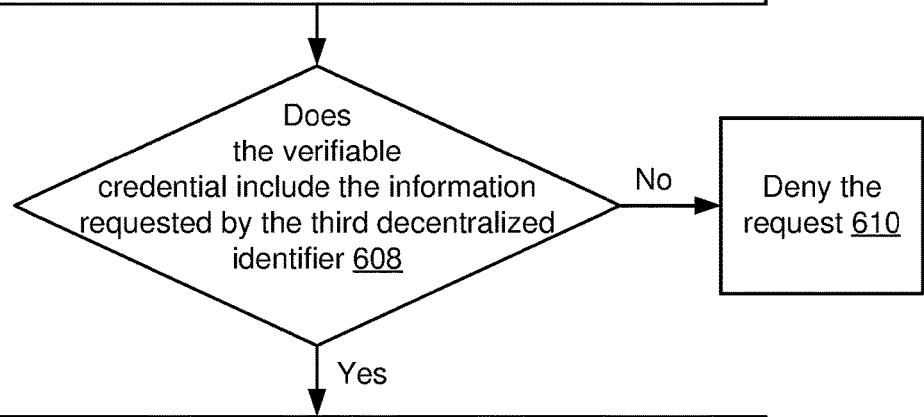

Request, by a first decentralized identifier associated with a decentralized web node, a verifiable credential from a second decentralized identifier, where the second decentralized identifier is included in a pool of decentralized identifiers 602

Receive, from the pool of decentralized identifiers and by the first decentralized identifier, the verifiable credential 604

Receive, from a third decentralized identifier and at the first decentralized identifier, a request to verify information associated with the first decentralized identifier 606

Does the verifiable credential include the information requested by the third decentralized identifier 608

No

Deny the request 610

Yes

Present, by the decentralized web node, at least a portion of the verifiable credential to the third decentralized identifier in response to determining that the verifiable credential includes the information 612

FIG 6

700

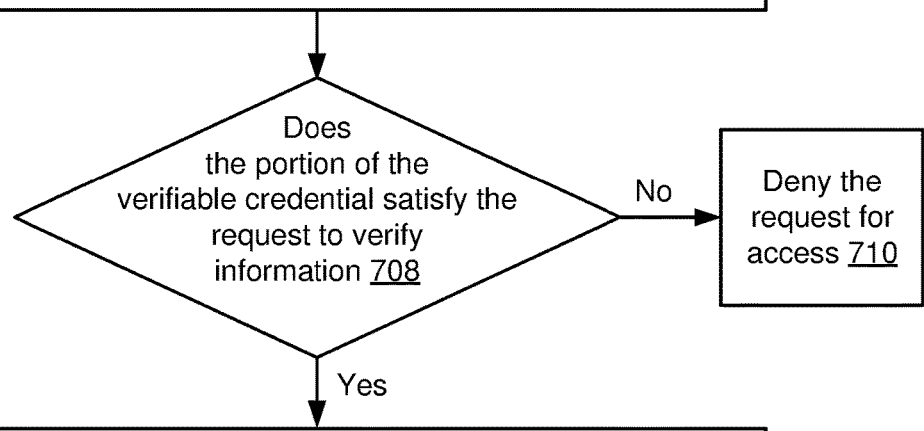

Receive, from a first decentralized identifier and at a second decentralized identifier, a request for access to a service provided by the second decentralized identifier 702

Provide, to the first decentralized identifier, a request to verify information associated with the first decentralized identifier, the information being from a verifiable credential that was issued by a pool of multiple decentralized identifiers 704

Receive a portion of the verifiable credential 706

Does the portion of the verifiable credential satisfy the request to verify information 708

No → Deny the request for access 710

Yes

Use the portion of the verifiable credential to satisfy the request for access to the service 712

FIG 7

800

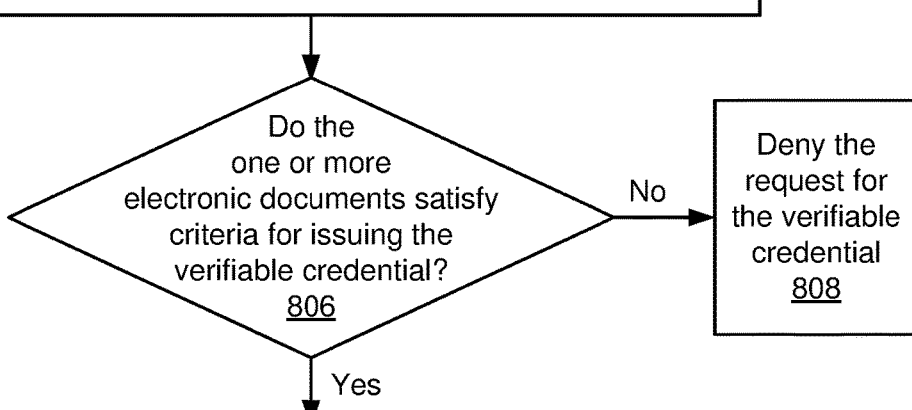

Receive, from a first decentralized identifier associated with a decentralized web node and by a second decentralized identifier, a request for a verifiable credential and one or more electronic documents that identify the first decentralized identifier 802

Join, by the second decentralized identifier, a pool of multiple decentralized identifiers that collectively issue verifiable credentials from the pool without indicating which of the multiple decentralized identifiers in the pool received respective requests 804

Do the one or more electronic documents satisfy criteria for issuing the verifiable credential? 806

No → Deny the request for the verifiable credential 808

Yes

Provide, by the pool of multiple decentralized identifiers and to the first decentralized identifier, the verifiable credential 810

FIG 8

1002
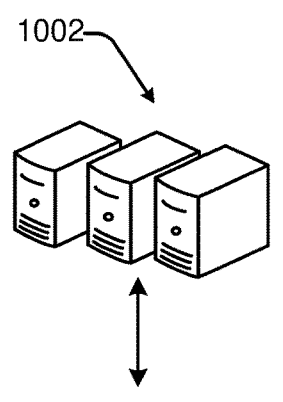
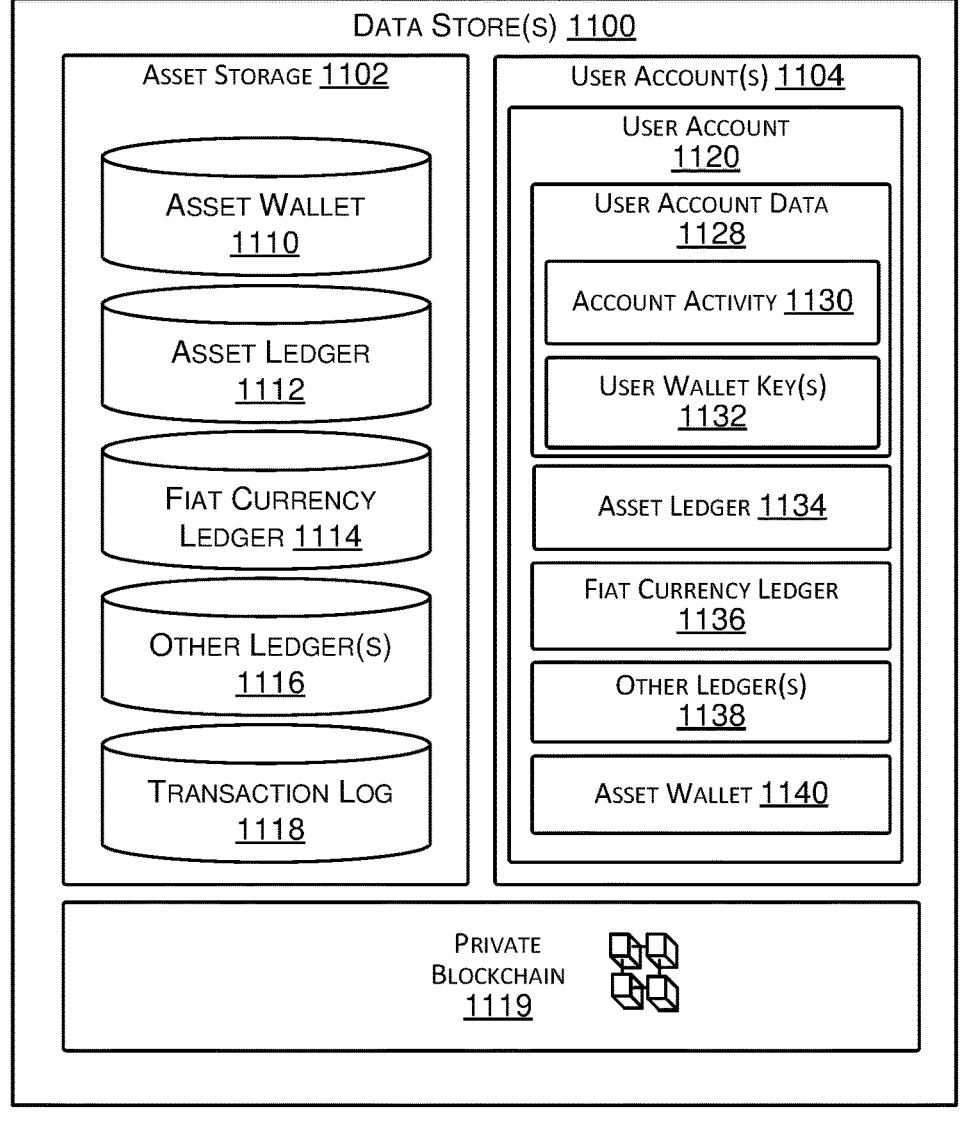
FIG 11

CREDENTIAL ISSUING POOLS IN A DECENTRALIZED NETWORK

TECHNICAL FIELD

Decentralized networks provide a variety of functionality in connection with implementing and securely transferring verifiable credentials. Additional functionality has been developed that leverages decentralized networks.

The description provided herein is for the purpose of presenting the context of the disclosure. Content of this section, as well as aspects of the description that may not otherwise qualify as prior art at the time of filing, are neither expressly nor impliedly admitted as prior art against the present disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is a flowchart illustrating an example method to obtain a verifiable credential from a pool of decentralized identifiers in accordance with some implementations;

FIG. 7 is a flowchart illustrating an example method to verify a request for access to a service based on receiving a verifiable credential in accordance with some implementations;

FIG. 8 is a flowchart illustrating an example method to join a pool of decentralized identifiers and issue verifiable credentials in accordance with some implementations;

FIG. 11 illustrates example data store(s) 1100 that can be associated with the server(s) 1002 with which techniques described herein may be implemented in accordance with some implementations;

Figure 13:
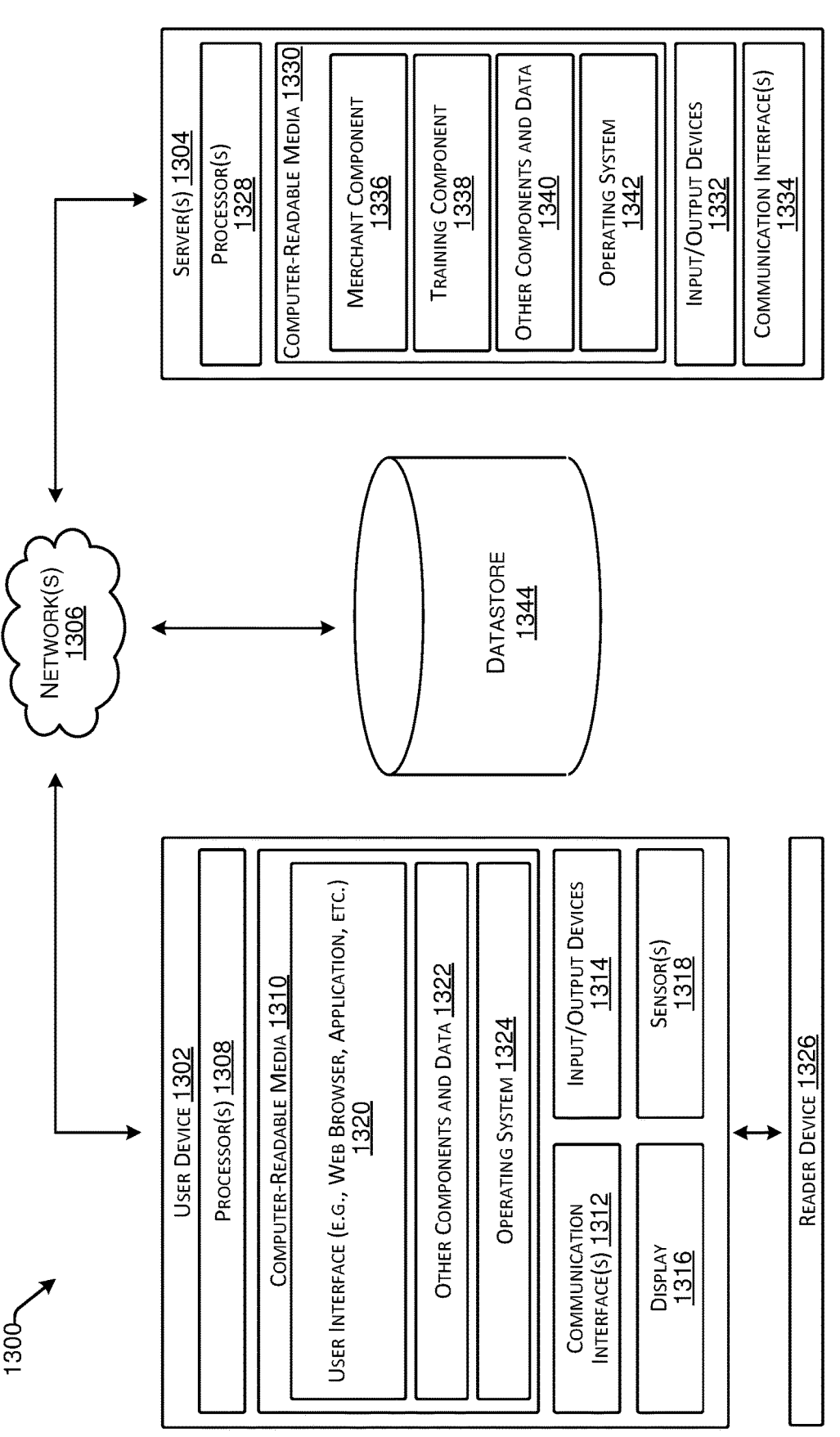

FIG. 13 is a block diagram illustrating a system that performs techniques described herein with which techniques described herein may be implemented in accordance with some implementations.

DETAILED DESCRIPTION

Decentralized identifiers are globally unique identifiers that are used to identify and/or authenticate an entity (e.g., an individual, a corporation, etc.) without using a central authority. Decentralized web nodes store discrete decentralized identifiers that are usable to prove the identity of an associated entity, along with storing other information associated with the respective decentralized identifiers. For example, an entity associated with a first decentralized identifier completes an educational course and requests a verifiable credential (e.g., a certificate of completion for the educational course) from the educational institution associated with a second decentralized identifier. The verifiable credential may include information about the course and the name of the educational institution. The verifiable credential, or a portion of the verifiable credential, can be presented to an entity associated with a third decentralized identifier. Continuing with the above example, the verifiable credential may be provided to a job recruiter associated with a third decentralized identifier in order to prove that the entity associated with a first decentralized identifier is qualified for a particular job as evidenced by completion of the educational course.

In another example, an entity may try to qualify for a clinical trial to treat a rare form of cancer. The entity may request a verifiable credential from a second decentralized identifier associated with a hospital at which the entity was treated and diagnosed. The verifiable credential is used as part of an application to be accepted in the clinical trial and may include sensitive and/or personally identifiable information about the person that is part of the clinical trial acceptance criteria. For example, in conventional techniques, if the second decentralized identifier is for a rural hospital (or other facility where the number of patients with the rare form of cancer is very low), a malicious third party may be able to use the verifiable credential to identify and exploit the entity based on the application and other data about the hospital (e.g., number of patients with the rare form of cancer at the hospital, which for a rural hospital may be very small). This is because the verifiable credential, in conventional scenarios, includes the name of the rural hospital. The techniques described herein securely identify or authenticate the entity by using the verifiable credential without revealing the identity of the entity or the hospital, thus keeping the entity's private information secure.

A pool of decentralized identifiers is used to securely authenticate the entities without revealing information that may expose entities presenting verifiable credentials. Specifically, instead of the verifiable credential including the second decentralized identifier, the verifiable credential includes a pool of decentralized identifiers, of which the second decentralized identifier is a part. Continuing with the second example above, if the first decentralized identifier receives the verifiable credential from a pool of decentralized identifiers where the pool includes a group of hospitals, the entity's identity is protected because the verifiable credential does not include the name of the specific hospital that is verifying the claim of the rare medical condition.

The pool of decentralized identifiers may be further described according to a trustworthiness score. The trustworthiness score may be based on a trustworthiness of the pool of decentralized identifiers. For example, if the pool of decentralized identifiers includes banks, the trustworthiness score of the pool of decentralized identifiers may be higher than if the pool of decentralized identifiers are financial applications. In some examples, the verifiable credential includes the trustworthiness score.

As a result of having different trustworthiness scores, different pools of decentralized identifiers may be associated with different tiers. Continuing with the example above, the pool of decentralized identifiers that describes banks may be for a first tier and the pool of decentralized identifiers that describes financial applications may be for a second tier, where the first tier is associated with a higher trustworthiness score than the second tier. A pool of decentralized identifiers may issue verifiable credentials that include the trustworthiness score and/or the corresponding tier. As a result of the trustworthiness score and/or the corresponding tier, an entity may be asked to provide additional documentation if the verifiable credential includes a lower trustworthiness score and/or a lower tier.

As part of the process of obtaining a verifiable credential, the entity often provides one or more electronic documents. For example, if the entity is a person that requests a verifiable credential that confirms the person's earnings that is used to apply for a mortgage, the person may provide multiple electronic documents that describe the entity's income, such as a paystub, a bank account balance, a credit score, tax documents, etc.

Once the first decentralized identifier receives the verifiable credential, the entity may use the verifiable credential to obtain access to services at a third decentralized identifier. In one example, when the entity requests the service from the third decentralized identifier, the entity may be asked to provide additional information when the verifiable credential indicates a lower trustworthiness score than a verifiable credential that indicates a higher trustworthiness score.

The first decentralized identifier may receive a request to verify information from the third decentralized identifier. Continuing with the example above, the entity may submit a mortgage application to a bank that is associated with the third decentralized identifier. The bank may request confirmation from the first decentralized identifier that the user has the income that is asserted on the mortgage application. A decentralized web node associated with the first decentralized identifier may determine that the verifiable credential includes the information requested by the third decentralized identifier. If the verifiable credential includes the requested information (e.g., confirmation of a person's income), the decentralized web node presents some or all of the verifiable credential that includes the requested information to the third decentralized identifier.

The determination of whether the decentralized web node provides some or all of the verifiable credential may be based on access control rules that specify how much of the verifiable credential to include. For example, the entity may want to provide confirmation of the entity's income, the identity of the pool of decentralized identifiers, and an identifier associated with the entity, but not an email address. The access control rules may be configured by an entity, such as through a user interface presented on an edge device associated with a decentralized node.

Pools comprising multiple decentralized identifiers may be formed to collectively issue verifiable credentials. In some cases, a decentralized identifier may receive a recommendation to join the pool of decentralized identifiers. For example, each decentralized identifier is associated with a decentralized identifier document stored in the associated decentralized web node (e.g., that is searchable and/or crawlable) that describes characteristics of the decentralized identifier. The characteristics of the decentralized identifier may match characteristics of the pool. Once a decentralized identifier joins the pool of decentralized identifiers, the decentralized identifier document may be updated to include the trustworthiness score associated with the pool of decentralized identifiers.

As a result of using a pool of decentralized identifiers to issue the verifiable credential, the described techniques advantageously ensure secure transmission of an entity's private information, while still providing verifiability of the entity's information. This addresses unique problems associated with verifiable credentials in a decentralized network. The added features of using different tiers and trustworthiness scores further ensure the security of the process of using verifiable credentials in a decentralized network. A variety of other examples are also contemplated that overcome technical challenges in support of a pool of decentralized identifiers, further discussion of which is included in the following sections and shown in corresponding figures.

In the following detailed description, references are made to the accompanying drawings that form a part hereof, and which are shown by way of illustration as specific implementations or examples. Referring now to the drawings, aspects of computing systems and methodologies for automatic generation of timing-based media content will be described in detail.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

Figure 1:
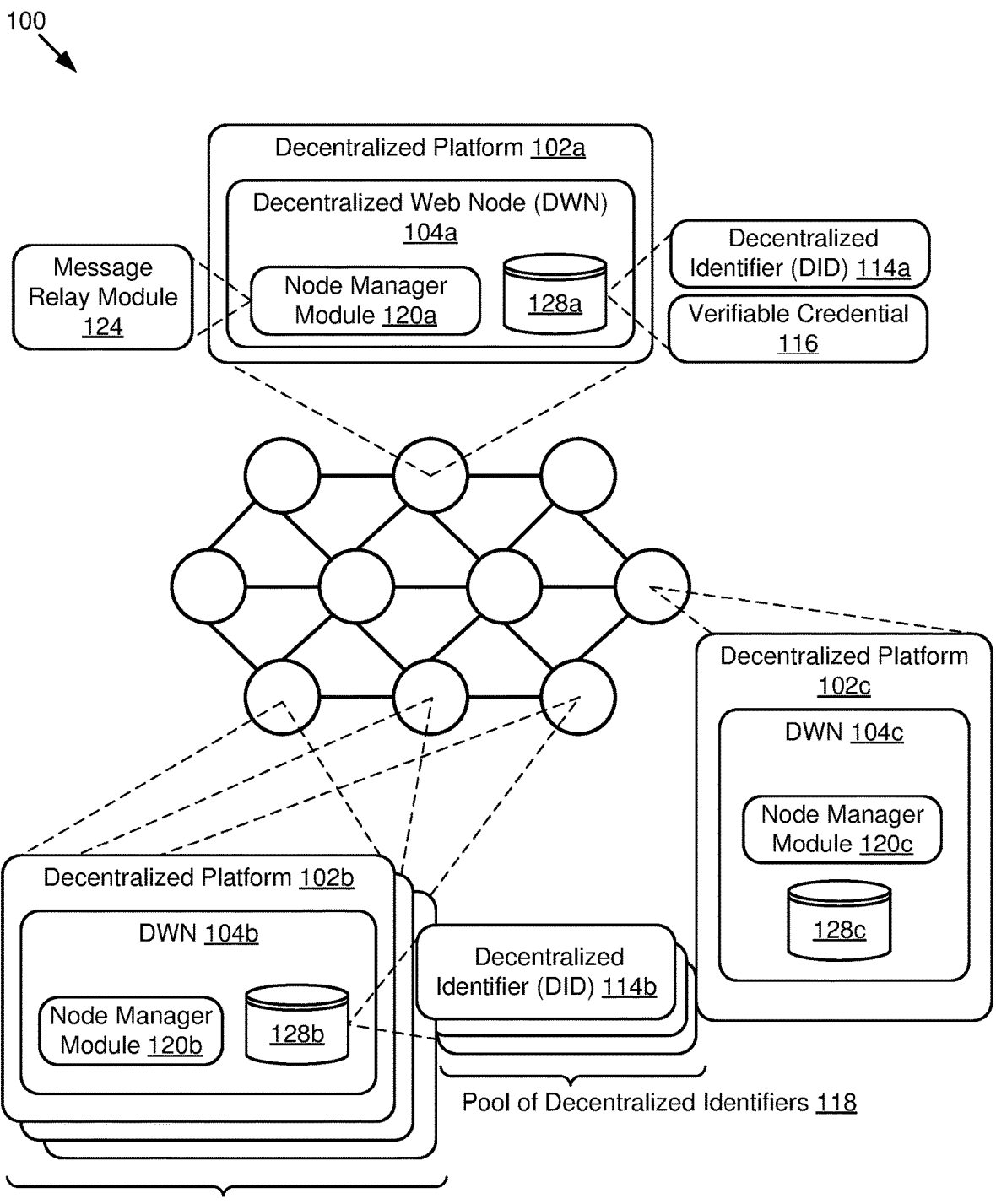
FIG. 1 is a diagram showing aspects of an illustrative operating environment of a decentralized platform and several logical components in accordance with some implementations.

FIG. 1 illustrates an operating environment for a decentralized platform and several logical components provided by the technologies described herein. In particular, FIG. 1 is a diagram showing a system 100, according to one implementation. The illustrated system 100 includes decentralized platforms 102a, 102b, and 102c that are each implemented using a plurality of web nodes, an example of which is illustrated as decentralized web nodes 104a, 104b, and 104c. In FIG. 1 and the remaining figures, a letter after a reference number, e.g., "104a," represents a reference to the element having that particular reference number, e.g., "a first decentralized web node 104a". A reference number in the text without a following letter, e.g., "104," represents a general reference to embodiments of the element bearing that reference number, e.g., "a decentralized web node 104".

The decentralized web node 104 is representative of a computer or other device tasked with validating transactions and/or maintaining a copy of shared data as further described below. Decentralized web nodes 104 are individual computing devices that participate in the decentralized platform 102 by sharing resources and maintaining a copy of the shared data, such as a verifiable credential 116. Each node functions independently, and there is no central authority governing the network. The overall functioning of a decentralized network is achieved through the collective efforts of these nodes, which follow a set of agreed-upon rules or protocols.

In accordance with the described techniques, the system 100 implements a decentralized platform 102 through the use of decentralized identifiers 114 and verifiable credentials 116. A decentralized identifier 114 is an address on the internet that is referred to as a subject. The decentralized identifier can be a person, a company, a device, a data model, etc. The decentralized identifier 114 is configured as a self-owned identifier that supports decentralized authentication and routing. A self-owned identifier is a unique identifier that is owned and controlled by an individual entity, also referred to as a "self-sovereign identity," as contrasted with an entity controlled by a centralized authority that is vulnerable to attacks, hacks, and data breaches.

A verifiable credential 116 is a data model and representation for cryptographically-verifiable digital credentials. The verifiable credential 116 can represent the same information as a physical credential represents, such as information related to identifying a subject of the credential (e.g., a photo, name, identification number), information related to the issuer of the verifiable credential 116 (e.g., a city government, national agency, certification body, etc.), information related to a type of credential (e.g., a Massachusetts license, a health insurance card, a Dutch passport, etc.), information related to specific attributes or properties being asserted by the issuer about the subject (e.g., nationality, a class of vehicle that the subject is entitled to drive, date of birth, etc.), evidence related to how the verifiable credential 116 was derived, and information related to constraints on the verifiable credential 116 (e.g., an expiration date, terms of use, etc.). As described below, the verifiable credential 116 may also include information about a pool of decentralized identifiers 118, such as a trustworthiness score or a tier associated with the pool of decentralized identifiers 118. The verifiable credential 116 uses a cryptographic presentation to ensure that the verifiable credential 116 is more trustworthy than its physical counterpart.

The decentralized web node 104 includes a node manager module 120 having a message relay module 124 that implements communication and message relay between the decentralized web nodes 104 of the decentralized platform 102 via a network (not illustrated).

The decentralized identifiers 114 are configurable without the use of subjective consensus as implemented using a conventional centralized service provider, but rather are self-generated and self-owned. The decentralized identifiers 114 are stored in a storage 128.

The decentralized web node 104 of the decentralized platform 102 supports data storage and relays that allow entities, service provider systems, individuals, organizations, and so forth to send, store, and receive encrypted or public messages and data. The decentralized web node 104 is universally addressable and is "crawlable" using data addressing in relation to the decentralized identifiers. The decentralized web is also configured to support decentralized replication of data across the nodes that is "eventually consistent" (e.g., the data is consistent across the nodes over time through continued data communication between the nodes) through communication of instances across individual nodes in the decentralized platform 102.

In some implementations, a decentralized identifier 114 may be described as being an issuer of verifiable credentials 116, a holder of verifiable credentials 116, and/or a verifier of verifiable credentials 116. Any decentralized identifier 114 may be an issuer, holder, or verifier, and the roles may be changed based on the circumstances of the interactions between the decentralized identifiers 114. A decentralized identifier 114 may have a verifiable credential 116 stored at an associated decentralized web node 104, and thus may act as a holder of a decentralized identifier 114 that receives a request from a verifier decentralized identifier 114 for information.

A first decentralized identifier 114a that is associated with an entity (e.g., a holder) requests a verifiable credential 116 from a second decentralized identifier 114b (e.g., an issuer). In some conventional systems, the second decentralized identifier 114b issues the verifiable credential 116 to the first decentralized identifier 114a. The verifiable credential 116 may include an identification of the second decentralized identifier 114b, which may be used by a malicious third party that intercepts or in some way obtains or accesses the verifiable credential 116 to identify and exploit the entity.

Rather than a single second decentralized identifier 114b that issues the verifiable credential 116, FIG. 1 illustrates a pool of decentralized platforms 117 that includes a pool of decentralized identifiers 118. The pool of decentralized identifiers 118 issues a verifiable credential 116 and provides the verifiable credential to the first decentralized identifier 114a. Accordingly, in examples, the pool of decentralized identifiers 118 is indicated as the issuer of the verifiable credential, rather than the second decentralized identifier 114b, providing enhanced anonymity to the holder (e.g., the first decentralized identifier 114a) when the verifiable credential is presented to a third party, without sacrificing the level of trust associated with the specific issue.

The first decentralized identifier 114a may request a service from a third decentralized identifier 114c (e.g., a verifier). The service may relate to finance, education, healthcare, professional credentials, legal identity, retail, etc. The third decentralized identifier 114c provides a request to the first decentralized identifier 114a to verify information associated with the first decentralized identifier 114a. For example, if the third decentralized identifier 114c provides a financial service, the request to verify information may include a request for the legal identity of an entity associated with the first decentralized identifier 114a. The node manager module 120a on a decentralized web node 104a that maintains the first decentralized identifier 114a may determine that the verifiable credential 116 includes the information requested by the third decentralized identifier 114c. The message relay module 124 may provide the verifiable credential 116 to the third decentralized identifier 114c.

The verifiable credential 116 presented to the third decentralized identifier 114c includes information about a pool of decentralized identifiers 118. For example, the verifiable credential 116 may identify a name associated with the pool of decentralized identifiers 118. The verifiable credential 116 may also include a trustworthiness score or a tier associated with the pool of decentralized identifiers 118. As a result of identifying the name of the pool of decentralized identifiers 118 and not the name of a particular decentralized identifier 114b, the verifiable credential 116 is more secure.

Figure 2:
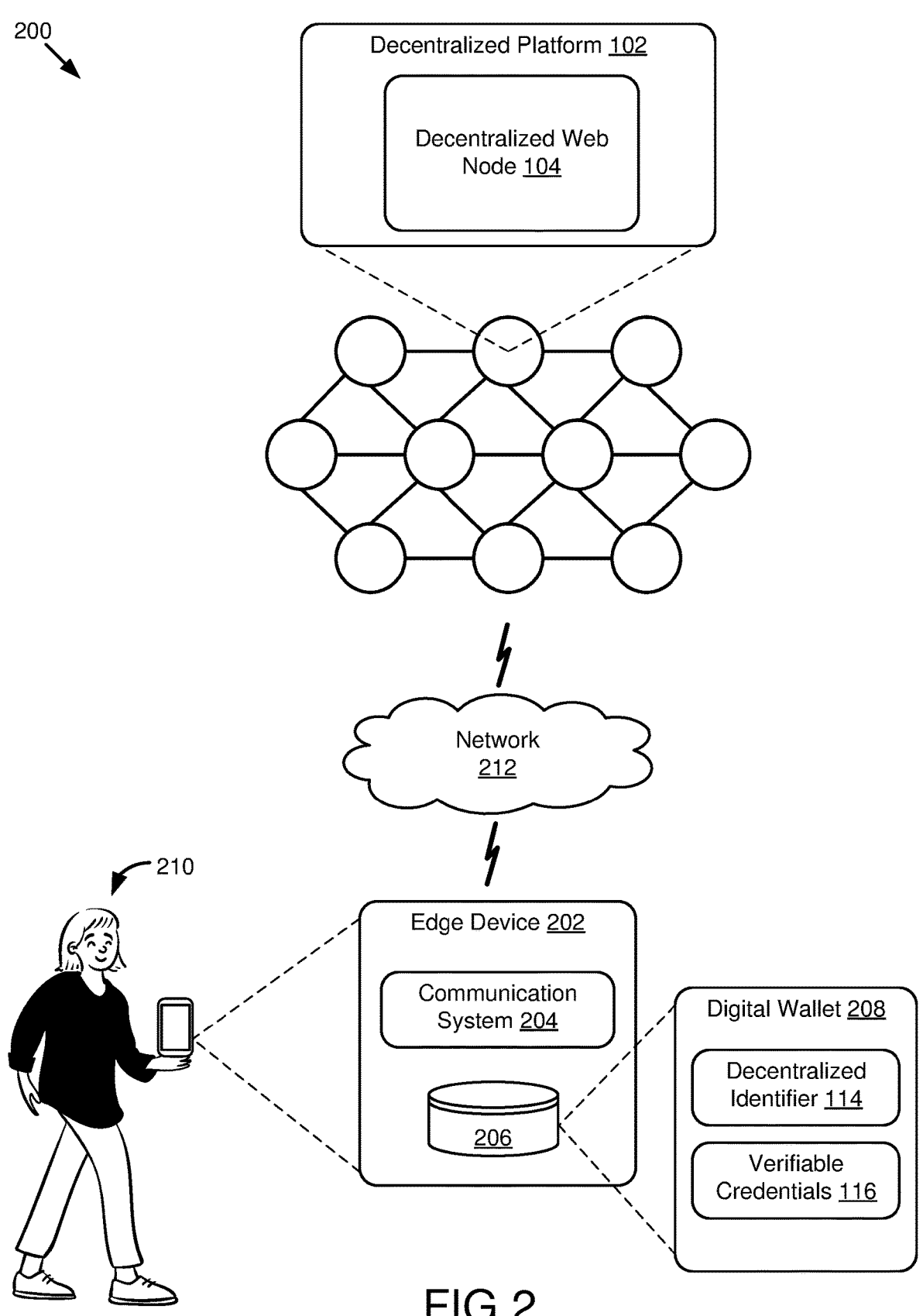
FIG. 2 is a diagram showing aspects of an illustrative operating environment where a decentralized platform communicates with an edge node in accordance with some implementations.

FIG. 2 is a diagram showing aspects of an illustrative operating environment where a decentralized platform communicates with an edge node provided by the technologies described herein. In particular, FIG. 2 is a diagram showing a system 200, according to one implementation. The system 200 includes a decentralized platform 102 that stores a decentralized web node 104.

The system 200 also includes an edge device 202 (e.g., a computing device) as representative of functionality available at an edge of the system 200 that is connected via a network 212 (e.g., a client device that is connected to system 200 over the Internet). Differing numbers of entities and edge devices may be operatively connected to the network 212 and/or in operation with the system 200.

Computing devices that implement the system 200 (e.g., the edge device 202) are configurable in a variety of ways. A computing device, for instance, is configurable as a server, a personal computer (PC), mobile device (e.g., laptop, mobile phone, smart phone, table computer, netbook computer, etc.), a wearable device, an internet of things (IoT) device, an augmented reality/virtual reality (AR/VR) device, a network-connected television, audio/video componentry with Internet access, network-connected cable set-top box, network-connected personal audio/video device, or other suitable device. Thus, a computing device ranges from full resource device with substantial memory and processor resources to low-resource devices with limited memory and/or processing resources. Although in instances in the following discussion reference is made to a computing device in the singular, a computing device may also represent any number of different computing devices, such as multiple servers of a server farm used to perform operations "over the cloud" as part of a service provider system.

The decentralized web node 104 of the decentralized platform 102 and the edge device 202 are communicatively coupled, one to another, via a network 212. In some implementations, the network 212 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

The edge device 202 is associated with an entity 210 (e.g., a user). The entity 210 may perform activities on the edge device 202. The activities performed on the edge device 202 may include, for example, transactions, payments, receivables, lending, and other activities. The activities can also include, for example, cash transfers, short term loans, credit, and other activities. The activities can also include, for example, family lending, social network lending, and other activities. The activities can also include, for example, crowd sourced funding, crowd sourced credit, crowd sourced lending, and other activities. The activities can also include, for example, personal payments, personal cash transfers, bill payments, and other activities. The activities can include, for example, payments for entertainment services, for example, purchases of songs and/or podcasts, subscription payments, and other activities. It is noted that these examples are non-exhaustive of all implementations, and other activities may also be within the scope of this disclosure.

The edge device 202 includes a communication system 204 that includes hardware and software functionality to support network communication, e.g., as a browser, a network-enabled application, an applet, etc. The edge device 202 also includes a storage device 206 that stores a digital wallet 208. The digital wallet 208 supports authentication and manages authorization of decentralized identifiers 114 and verifiable credentials 116 that include information about a pool of decentralized identifiers that issued the verifiable credentials 116. The digital wallet 208 also supports, creates, updates, and recovers decentralized identifiers 114. The digital wallet 208 is further configurable to support context management to maintain an environment in which decentralized identifiers 114 are usable within a given contact, application, or context as well as credential functions to sign, verify, discover, and present credentials to verifying parties.

The digital wallet 208 also includes functionality to generate and output a user interface and corresponding features to manage credentials and other data stored in a decentralized web node 104 as part of a decentralized platform 102. The user interface may include functionality for specifying the type of information in the verifiable credential 116, such as an identification of the pool of decentralized identifiers that issued the verifiable credential 116. As part of this functionality, the digital wallet 208 is configured to output a request for a verifiable credential 116 from the decentralized web node 104.

Figure 3:
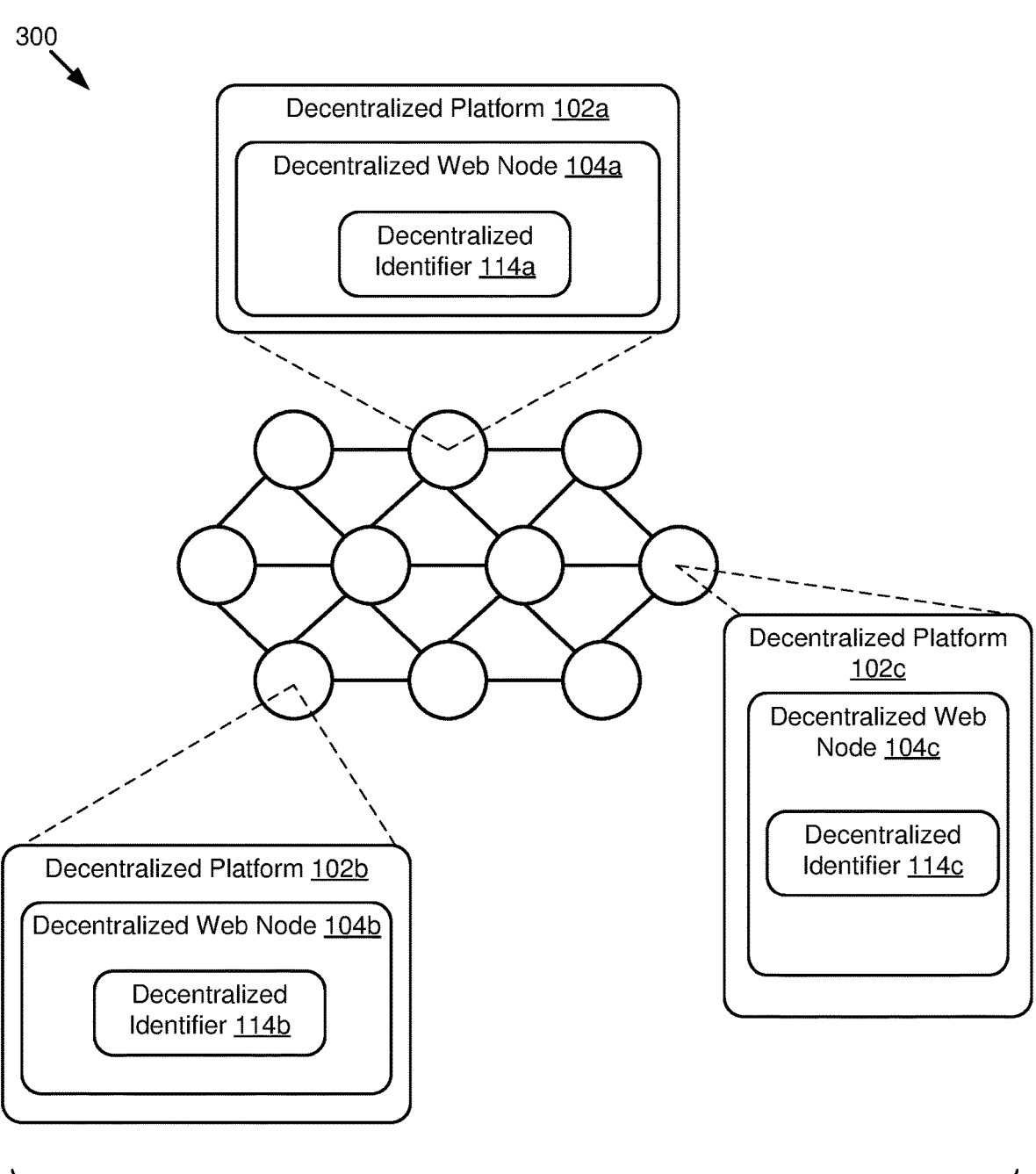
FIG. 3 is a diagram showing aspects of an illustrative operating environment where pools of decentralized identifiers are formed in accordance with some implementations.

FIG. 3 is a diagram showing aspects of an illustrative operating environment where pools of decentralized identifiers are formed as provided by the technologies described herein. FIG. 3 illustrates a system 300 that includes three decentralized platforms 102: a first decentralized platform 102a, a second decentralized platform 102b, and a third decentralized platform 102c. Each decentralized platform 102 includes a decentralized web node 104 that stores a decentralized identifier 114.

A pool of decentralized identifiers 118 may be formed in multiple ways. A pool may be formed based on the type, classification, certification, and/or characteristics of an entity associated with a decentralized identifier 114. For example, entities associated with the decentralized identifiers 114 may be of a type such as financial institutions, government agencies, educational institutions, certification bodies, etc. The pool of decentralized identifiers 118 may be formed from geographically disparate entities. For example, where the pool of decentralized identifiers 118 is formed from different hospitals, the pool of decentralized identifiers 118 may include hospitals from rural areas, cities with large populations, locations in different states, etc. Examples are also considered in which the pool of decentralized identifiers 118 are formed from geographically proximate entities, such as merchants at a local farmer's market, parents of children at an elementary school, or the like.

The pool of decentralized identifiers 118 may be formed from entities of different sizes. For example, where the pool of decentralized identifiers 118 includes merchants, the merchants may include companies with a few employees, several thousand, tens of thousands, etc. The pool of decentralized identifiers 118 may be formed from entities associated with participating financial institutions (PFIs). The pool of decentralized identifiers 118 may be formed from different types of entities. For example, the pool of decentralized identifiers 118 may include companies that provide verifiable credentials for certification where the types of verification are varied, such as degree certification, licensing certification, continuing legal education certification, trade school certification, etc.

A decentralized document describes a decentralized identifier 114, and at least portions of the decentralized document may be publicly accessible on a decentralized network to obtain information about the decentralized identifier. The decentralized document may include encryption keys (e.g., public keys), pseudonymous biometrics (or other authentication data) that an entity may use to authenticate itself as a decentralized identifier 114, attributes describing the decentralized identifier 114, etc. In some implementations, the attributes describing the decentralized identifier 114 include identification of the type of decentralized identifier 114.

In some cases, the pool of decentralized identifiers 118 may employ governance for various aspects of the pool, such as admission of new members to the pool, removal of members from the pool, types of verifiable credentials issued by the pool, and so forth. For instance, the pool may operate as a decentralized autonomous organization ("DAO") in which voting, finances, and the like are managed via smart contracts implemented on a blockchain. The pool may have access to a shared DWN with a corresponding node manager module configured to crawl decentralized documents for attributes matching those that qualify for the pool. The members of the pool may vote on aspects for obtaining new members, such as which attributes to crawl for, how often to crawl for new members, what happens when a match is identified (e.g., automatic admission to the pool, voting to admit to the pool, etc.), and so on.

In some implementations, the first decentralized identifier 114a joins a pool of decentralized identifiers 118 that includes the second decentralized identifier 114b and the third decentralized identifier 114c. The pool of decentralized identifiers 118 may recommend that the first decentralized identifier 114a join the pool of decentralized identifiers 118 based on the decentralized identifier document associated with the first decentralized identifier 114a describing characteristics that match the pool of decentralized identifiers 118. For example, the pool of decentralized identifiers 118 may be for institutions that provide different forms of certification and the pool of decentralized identifiers 118 may recommend other similar certification companies join the pool. In some implementations, the pool of decentralized identifiers may be formed from decentralized identifiers with different types of attributes.

In some implementations, the pool of decentralized identifiers 118 may be associated with a trustworthiness score. The trustworthiness score may be based on a type of the pool of decentralized identifiers 118. For example, where the pool of decentralized identifiers 118 includes government agencies that provide verifiable credentials for different forms of identification, a high trustworthiness score may be associated with the Department of State, which issues verifiable credentials after authenticating a passport, and a lower trustworthiness score may be associated with different public schools that issue verifiable credentials after authenticating student identifiers. The trustworthiness score may be assigned to a pool of decentralized identifiers 118 by a governing body or may be agreed upon by the decentralized identifiers 114. In some implementations, the decentralized identifier document includes the trustworthiness score. In some cases, the trustworthiness score may change over time, such as based on verifiable credential holder feedback and/or sentiment (e.g., viewable as a sentiment document), verifiable credentials issued to the pool itself, verifiable credentials issued to the individual members of the pool, and the like.

In some implementations, the pool of decentralized identifiers 118 may be associated with different tiers based on the trustworthiness score. For example, where the pool of decentralized identifiers 118 is for financial institutions, a first tier may include banks and a second tier may include financial applications. Any number of tiers may be possible depending upon the different types of pools of decentralized identifiers 114 and the variation in the trustworthiness score.

Figure 4:
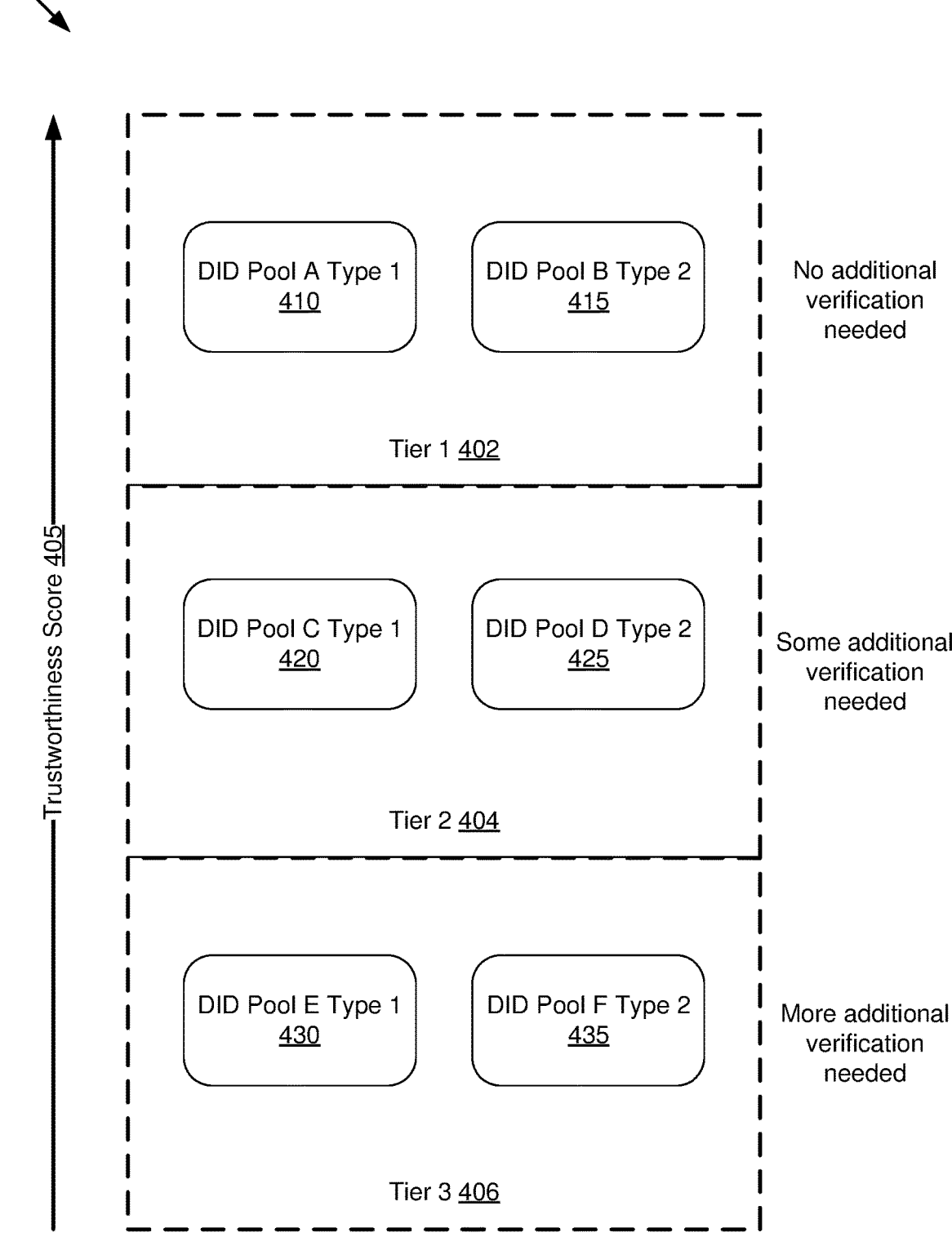
FIG. 4 is a diagram showing aspects of a tiered system of pools of decentralized identifiers in accordance with some implementations.

Turning to FIG. 4, a diagram 400 is illustrated that shows aspects of a tiered system of pools of decentralized identifiers. In this example, pools of decentralized identifiers 118 are divided into three tiers: tier 1 402, tier 2 404, and tier 3 406. Tier 1 402 includes two different types of pools of decentralized identifiers: decentralized identifier pool A type 1 410 and decentralized identifier pool B type 2 415. Tier 2 404 includes two different types of pools of decentralized identifiers: decentralized identifier pool C type 1 420 and decentralized identifier pool D type 2 425. Tier 3 406 includes two different types of pools of decentralized identifiers: decentralized identifier pool E type 1 430 and decentralized identifier pool F type 2 435. In the illustrates example, the trustworthiness score 405 is inversely proportional to the tier number such that tier 1 402 has a higher trustworthiness score 405 than tier 3 406, although any suitable score-to-tier correlation is contemplated.

A pool of decentralized identifiers 118 may be associated with a particular tier based on having a trustworthiness score that meets or exceeds a threshold score value. For example, the decentralized identifier pool A type 1 410 and the decentralized identifier pool B type 2 415 a pool of decentralized identifiers 118 may be associated with a first tier 1 402 based on the respective trustworthiness scores meeting a threshold score value. The decentralized identifier pool C type 1 420 and the decentralized identifier pool D type 2 may be associated with tier 2 404, or the pool of decentralized identifiers 118 may be associated with a second tier based on the respective trustworthiness scores falling below the threshold score value for tier 2 404 but exceeding a threshold score value for tier 3 406. Lastly, the decentralized identifier pool E type 1 and the decentralized identifier pool F type 2 may be associated with tier 3 406 based on respective trustworthiness scores falling below the threshold score value for tier 2 404. In some implementations, the trustworthiness score and/or the tier may be included as part of the verifiable credential.

In some implementations, each member of the pool of decentralized identifiers 118 may agree to a collection of rules related to issuance of verifiable credentials. For example, the rules may specify how the trustworthiness score is calculated, whether the trustworthiness score is included as part of the verifiable credential, whether the tier is included as part of the verifiable credential, etc. The collection of rules may be part of the decentralized identifier document or may be separate.

In some implementations, the trustworthiness score and/or the tier of the pool of decentralized identifiers may be used by a decentralized identifier that verifies information (hereinafter "verifier decentralized identifier" for clarity) based on the verifiable credential. The verifier decentralized identifier may request information before providing a service and the request for information may be based on the trustworthiness score and/or the tier of the pool of decentralized identifiers. For example, continuing with FIG. 4, tier 1 402 is the highest tier and verified credentials issued by the decentralized identifier pool A type 1 410 or the decentralized identifier pool B type 2 415 are used to obtain a service without additional verification. Tier 2 404 is the second highest tier and verified credentials issued by the decentralized identifier pool B type 1 420 or the decentralized identifier pool D type 2 425 are used to obtain a service with some additional verification needed. Tier 3 406 is the lowest tier and verified credentials issued by the decentralized identifier pool E type 1 430 or the decentralized identifier pool F type 2 435 are used to obtain a service with more additional verification needed than what is associated with tier 2 404.

In another example, continuing with the example above where a pool of decentralized identifiers for banks is associated with tier 1 and a pool of decentralized identifiers for financial applications is associated with tier 2, the decentralized identifier that verifies information may request more information for entities that provide verifiable credentials from pools of decentralized identifiers associated with tier 2 or lower trustworthiness scores as compared with pools of decentralized identifiers associated with tier 1 or higher trustworthiness scores. In some examples, the information requested may be more information or different information depending on the tier and/or the trustworthiness score.

In some implementations, a first decentralized identifier associated with an entity receives a verifiable credential from a pool of decentralized identifiers associated with a trustworthiness score and/or a tier based on the type and/or number of electronic documents that the first decentralized identifier provides to a second decentralized identifier. For example, the first decentralized identifier may be associated with a user that is requesting a verifiable credential in order to complete employee orientation. The first decentralized identifier may be assigned to a particular pool of decentralized identifiers depending on how much information the first decentralized identifier provides. For example, if the first decentralized identifier provides information for setting up payroll, proof of education, and citizenship status, the assigned pool of decentralized identifiers may be the decentralized identifier pool E type 1 430 in tier 3 406 with a lower trustworthiness score. Conversely, if the first decentralized identifier provided all the electronic documents for employee orientation, the assigned pool of decentralized identifiers may be the decentralized identifier pool A type 1 410 in tier 1 402.

Figure 5A:
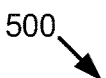
FIG. 5A is a diagram of an example user interface for a digital wallet that includes access control options in accordance with some implementations.

The pool of decentralized identifiers transmits a verifiable credential to a decentralized identifier that requested the verifiable credential. The verifiable credential may be stored in a digital wallet along with the decentralized identifier. The digital wallet may be configured via a user interface. FIG. 5A is a diagram 500 of an example user interface 505 for a digital wallet that includes access control options. The example user interface 505 may be displayed by the edge device described above with reference to FIG. 2.

The user interface 505 includes access control options for the verifiable credential. The user may control what portions of the verifiable credential are provided to a decentralized identifier that acts as a verifier. The user may want to include all the information to reduce the amount of information that the user has to retype, the user may want to include the minimal amount of information to preserve the user's private information, or other factors may be involved. The user interface 505 also includes selectable controls at the bottom of the user interface 508 to view a list of verifiable credentials 507, an option to scan documents 509, and information about the decentralized identifiers 511.

The user interface 505 instructs the user to select checkboxes for all attributes that the user wants to share for the verifiable credential. In this example, a user is applying to be part of a clinical trial and is configuring the verifiable credential to include proof that the user has an illness that is addressed by the clinical trial. The attributes that can be included as part of the verifiable credential include confirmation of the user's illness 515, a unique identifier 520, the user's birthday 525, medication taken by the user 530, the user's email address 535, the name of the pool of decentralized identifiers that issued the verifiable credential 540, and a trustworthiness score for the pool 545. Once the user is satisfied with the options, the user may select the next button 550.

A first decentralized identifier that acts as a holder of the verifiable credential requests a service from a third decentralized identifier that acts as a verifier. The third decentralized identifier requests information from the first decentralized identifier to access the service. Continuing with the example above, the third decentralized identifier may request information that confirms that a patient has a particular illness that is part of a clinical trial. A node manager module of the decentralized web node that is associated with the first decentralized identifier determines that the verifiable credential includes the information requested by the third decentralized identifier. The decentralized web node presents at least a portion of the verifiable credential to the third decentralized identifier in response to determining that the verifiable credential includes the information. The portion of the verifiable credential may be determined based on the access control rules described above with reference to FIG. 5A.

Figure 5B:
FIG. 5B is a diagram of an example verifiable credential as presented to the verifier decentralized identifier in accordance with some implementations.

FIG. 5B is a diagram of an example verifiable credential 550 as presented to the verifier decentralized identifier. Based on the selections made with reference to FIG. 5A, the verifiable credential includes confirmation of the illness 505, the patient's birthday 510, the patient's medication 515, the name of the pool of decentralized identifiers that issued the verifiable credential 520, and the trustworthiness score for the pool of decentralized identifiers 525.

In some implementations, after the decentralized identifier that acts as a verifier receives the portion of the verifiable credential from the decentralized web node, the decentralized identifier may send a request for information to the decentralized identifier that acts as a holder. The request for information may be based on the trustworthiness score associated with the pool of decentralized identifiers. For example, if the trustworthiness score is lower, the decentralized identifier that acts as a verifier may ask for more information or different information than if the trustworthiness score is higher. The decentralized identifier that acts as a verifier may grant access to a service based on the responses.

FIG. 6 is a flowchart showing aspects of a method 600 to obtain a verifiable credential from a pool of decentralized identifiers provided by the technologies described herein. Method 600 may begin at block 602.

At block 602, a first decentralized identifier associated with a decentralized web node requests a verifiable credential from a second decentralized identifier, where the second decentralized identifier is included in a pool of decentralized identifiers. The pool of decentralized identifiers may include decentralized identifiers selected from geographically disparate locations, decentralized identifiers with different sizes, based on different private finance initiatives, and/or different types of decentralized identifiers. Block 602 is followed by block 604.

At block 604, the first decentralized identifier receives from the pool of decentralized identifiers, the verifiable credential. The verifiable credential may indicate the pool of decentralized identifiers as an issuer without indicating the second decentralized identifier. The verifiable credential may include a trustworthiness score that reflects a trustworthiness associated with the pool of decentralized identifiers. The trustworthiness score may be included in a decentralized identifier document associated with the second decentralized identifier.

The pool of decentralized may be associated with a first tier that is based on the trustworthiness score meeting a threshold score value. A second tier may be associated with the trustworthiness score falling below the threshold score value. In some implementations, the method 600 further includes providing multiple electronic documents to the second decentralized identifier to authenticate the first decentralized identifier, where the first decentralized identifier receives the verifiable credential from the pool of decentralized identifiers that is associated with the first tier based on a type of the multiple electronic documents or a number of the multiple electronic documents provided to the second decentralized identifier. Block 604 is followed by block 606.

At block 606, the first decentralized identifier may receive from a third decentralized identifier a request to verify information associated with the first decentralized identifier. For example, the information may include a certificate of completion of an educational requirement, a verification of income, a proof of purchase, a contract approved by a parent of a child at a school, etc. Block 606 is followed by block 608.

At block 608, it is determined whether the verifiable credential includes the information requested by the third decentralized identifier 608. If the verifiable credential does not include the information requested by the third decentralized identifier, block 608 may be followed by block 610. At block 610, the request is denied. If the verifiable credential includes the information requested by the third decentralized identifier, block 608 may be followed by block 612.

At block 612, the decentralized web node presents at least a portion of the verifiable credential to the third decentralized identifier in response to determining that the verifiable credential includes the information. In some implementations, the method 600 further includes providing, by the first decentralized identifier, access control rules that describe the portion of the verifiable credential to be presented by the decentralized web node to the third decentralized identifier. For example, the access controls may specify that email addresses are not to be shared with the third decentralized identifier.

In some implementations, the decentralized web node receives one or more requests for additional information from the third decentralized identifier. For example, the additional information may include documentation showing that a user has funds for a downpayment. The one or more requests for additional information may be based on the trustworthiness score associated with the pool of decentralized identifiers and the decentralized web node provides responses to the one or more requests to the third decentralized identifier, where access to a service provided by the third decentralized identifier is granted based on the responses.

FIG. 7 is a flowchart showing aspects of a method 700 to verify a request for access to a service based on receiving a verifiable credential provided by the technologies described herein. Method 700 may begin at block 702.

At block 702, a second decentralized identifier receives from a first decentralized identifier a request for access to a service provided by the second decentralized identifier. Block 702 may be followed by block 704.

At block 704, the first decentralized identifier provides a request to verify information associated with the first decentralized identifier, the information being from a verifiable credential that was issued by a pool of multiple decentralized identifiers. The pools of multiple decentralized identifiers may include a third decentralized identifier that is unidentifiable from the information. Block 704 may be followed by block 706.

At block 706, a portion of the verifiable credential is received. The portion of the verifiable credential may include a trustworthiness score that reflects a trustworthiness associated with the pool of multiple decentralized identifiers and using the at least the portion of the verifiable credential to satisfy the request for access to the service is based on the trustworthiness score exceeding a threshold score value. The verifiable credential may be associated with a first tier that is based on the trustworthiness score meeting a threshold score value, and a second tier is associated with the trustworthiness score falling below the threshold score value. Block 706 is followed by block 708.

At block 708, it is determined whether the portion of the verifiable credential satisfies the request to verify information. If the portion of the verifiable credential does not satisfy the request to verify information, block 708 may be followed by block 710. At block 710, the request for access is denied. If the portion of the verifiable credential satisfies the request to verify information, block 710 may be followed by block 712.

At block 712, the portion of the verifiable credential is used to satisfy the request for access to the service. In some implementations, the method 700 further includes providing, by the third DID, one or more requests for information for the first decentralized identifier, wherein the one or more requests for information are based on the trustworthiness score associated with the pool of decentralized identifiers and receiving, from the decentralized web node, responses to the one or more requests, wherein access to the service is granted based on the responses.

FIG. 8 is a flowchart showing aspects of a method 800 to join a pool of decentralized identifiers and issue verifiable credentials provided by the technologies described herein. Joining the pool of multiple decentralized identifiers may include providing an acceptance of a collection of rules related to issuance of verifiable credential. Method 800 may begin at block 802.

At block 802, a second decentralized identifier receives from a first decentralized identifier associated with a decentralized web node a request for a verifiable credential. The request for the verifiable credential may include one or more electronic documents that identify the first DID and the pool of decentralized identifiers may provide the verifiable credential to the first decentralized identifier based on a type of the one or more electronic documents or a number of the one or more electronic documents provided to the second decentralized identifier. Block 802 may be followed by block 804.

At block 804, the second decentralized identifier joins a pool of multiple decentralized identifiers that collectively issue verifiable credentials from the pool without indicating which of the multiple decentralized identifiers in the pool received respective requests. The method 800 may include receiving a recommendation to join the pool of multiple decentralized identifiers based on the second decentralized identifier having a decentralized identifier document with characteristics that match the pool of multiple decentralized identifiers. Block 804 may be followed by block 806.

At block 806, it is determined whether the one or more electronic documents satisfy criteria for issuing the verifiable credential. For example, the one or more electronic documents may not provide enough information to properly identify an entity associated with the first decentralized identifier. If the one or more electronic documents do not satisfy the criteria, block 806 may be followed by block 808. At block 808, the request for the verifiable credential is denied. Block 808 may be followed by block 810.

At block 810, the pool of multiple decentralized identifiers provide to the first decentralized identifier the verifiable credential.

Figure 9:
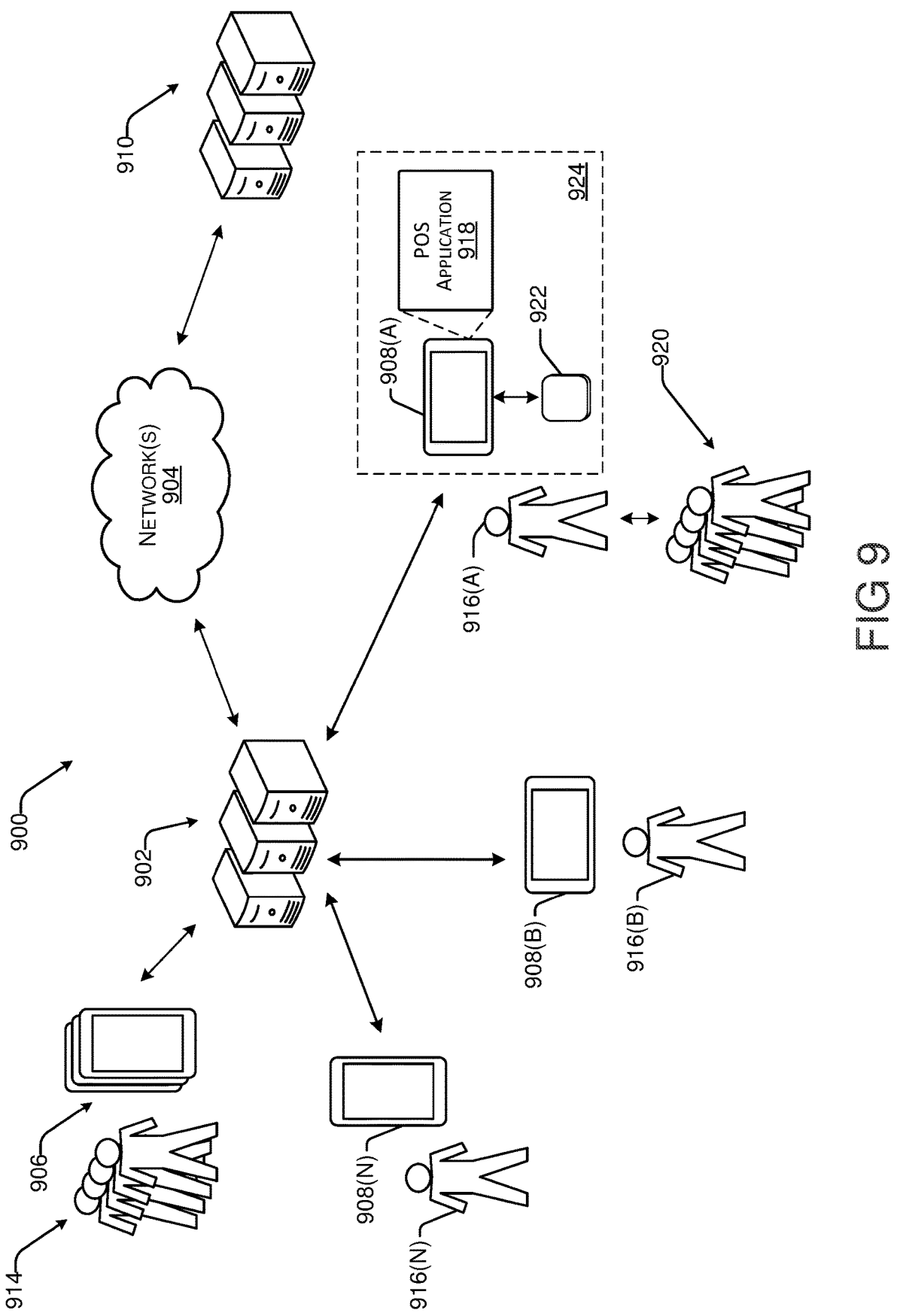
FIG. 9 illustrates an example environment with which techniques described herein may be implemented in accordance with some implementations.

FIG. 9 illustrates an example environment 900. The environment 900 includes server(s) 902 that can communicate over a network 904 with user devices 906 (which, in some examples can be merchant devices 908 (individually, 908(A)-908(N))) and/or server(s) 910 associated with third-party service provider(s). The server(s) 902 can be associated with a service provider that can provide one or more services for the benefit of users 914, as described below. Actions attributed to the service provider can be performed by the server(s) 902.

In some implementations, the server(s) 902 and the user devices 906 may include the decentralized platform 102 of FIG. 1. For example, a user may be associated with a first decentralized identifier 114a and a server 902 may be associated with a third decentralized identifier 114c of FIG. 1. In some implementations, the user device 906 may also include the edge device 202 and the server 902 may include the decentralized platform 102 of FIG. 2.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

As described above, in at least one example, the users 914 can include merchants 916 (individually, 916(A)-916(N)). In an example, the merchants 916 can operate respective merchant devices 908, which can be user devices 906 configured for use by merchants 916. For the purpose of this discussion, a "merchant" can be any entity that offers items (e.g., goods or services) for purchase or other means of acquisition (e.g., rent, borrow, barter, etc.). The merchants 916 can offer items for purchase or other means of acquisition via brick-and-mortar stores, mobile stores (e.g., pop-up shops, food trucks, etc.), online stores, combinations of the foregoing, and so forth. In some examples, at least some of the merchants 916 can be associated with a same entity but can have different merchant locations and/or can have franchise/franchisee relationships. In additional or alternative examples, the merchants 916 can be different merchants. That is, in at least one example, the merchant 916(A) is a different merchant than the merchant 916(B) and/or the merchant 916(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 908 can have an instance of a POS application 918 stored thereon. The POS application 918 can configure the merchant device 908 as a POS terminal, which enables the merchant 916(A) to interact with one or more customers 920. As described above, the users 914 can include customers, such as the customers 920 shown as interacting with the merchant 916(A). For the purpose of this discussion, a "customer" can be any entity that acquires items from merchants. While only two customers 920 are illustrated in FIG. 9, any number of customers 920 can interact with the merchants 916. Further, while FIG. 9 illustrates the customers 920 interacting with the merchant 916(A), the customers 920 can interact with any of the merchants 916.

In at least one example, interactions between the customers 920 and the merchants 916 that involve the exchange of funds (from the customers 920) for items (from the merchants 916) can be referred to as "transactions." In at least one example, the POS application 918 can determine transaction data associated with the POS transactions. Transaction data can include payment information, which can be obtained from a reader device 922 associated with the merchant device 908(A), user authentication data, purchase amount information, point-of-purchase information (e.g., item(s) purchased, date of purchase, time of purchase, etc.), etc. The POS application 918 can send transaction data to the server(s) 902 such that the server(s) 902 can track transactions of the customers 920, merchants 916, and/or any of the users 914 over time. Furthermore, the POS application 918 can present a UI to enable the merchant 916(A) to interact with the POS application 918 and/or the service provider via the POS application 918.

In at least one example, the merchant device 908(A) can be a special-purpose computing device configured as a POS terminal (via the execution of the POS application 918). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the merchant device 908(A), such as a microphone port, a headphone port, an audio-jack, a data port, or other suitable port. In additional or alternative examples, the reader device 922 can be coupled to the merchant device 908(A) via another wired or wireless connection, such as via a Bluetooth®, BLE, and so on. In some examples, the reader device 922 can read information from alternative payment instruments including, but not limited to, wristbands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 922, and communicate with the server(s) 902, which can provide, among other services, a payment processing service. The server(s) 902 associated with the service provider can communicate with server(s) 910, as described below. In this manner, the POS terminal and reader device 922 may collectively process transaction(s) between the merchants 916 and customers 920. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to the customers 920. In additional or alternative examples, the POS terminal can have a display integrated therein for presenting information to the customers 920. POS systems, such as the POS system 924, may be mobile, such that POS terminals and reader devices may process transactions in disparate locations across the world. POS systems can be used for processing card-present transactions and card-not-present (CNP) transactions, as described below.

A card-present transaction is a transaction where both a customer 920 and his or her payment instrument are physically present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server(s) 910 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 924, the server(s) 902, and/or the server(s) 910 may exchange payment information and transaction data to determine whether transactions are authorized. For example, the POS system 924 may provide encrypted payment data, user authentication data, purchase amount information, point-of-purchase information, etc. (collectively, transaction data) to server(s) 902 over the network(s) 904. The server(s) 902 may send the transaction data to the server(s) 910. As described above, in at least one example, the server(s) 910 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 910 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 910 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 910 associated therewith), and a payment authorization message is communicated from the issuer to the POS device via a path opposite of that described above, or via an alternate path.

As described above, the server(s) 910, which can be associated with payment service provider(s), may determine whether the transaction is authorized based on the transaction data, as well as information relating to parties to the transaction (e.g., the customer 920 and/or the merchant 916(A)). The server(s) 910 may send an authorization notification over the network(s) 904 to the server(s) 902, which may send the authorization notification to the POS system 924 over the network(s) 904 to indicate whether the transaction is authorized. The server(s) 902 may also transmit additional information such as transaction identifiers to the POS system 924. In one example, the server(s) 902 may include a merchant application and/or other functional components for communicating with the POS system 924 and/or the server(s) 910 to authorize or decline transactions.

Based on the authentication notification that is received by the POS system 924 from server(s) 902, the merchant 916(A) may indicate to the customer 920 whether the transaction has been approved. In some examples, approval may be indicated at the POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 914 can access all of the services of the service provider. In other examples, the users 914 can have gradated access to the services, which can be based on risk tolerance, IDV outputs, subscriptions, and so on. In at least one example, access to such services can be availed to the merchants 916 via the POS application 918. In additional or alternative examples, each service can be associated with its own access point (e.g., application, web browser, etc.).

The service provider can offer payment processing services for processing payments on behalf of the merchants 916, as described above. For example, the service provider can provision payment processing software, payment processing hardware and/or payment processing services to merchants 916, as described above, to enable the merchants 916 to receive payments from the customers 920 when conducting POS transactions with the customers 920. For instance, the service provider can enable the merchants 916 to receive cash payments, payment card payments, and/or electronic payments from customers 920 for POS transactions and the service provider can process transactions on behalf of the merchants 916.

As the service provider processes transactions on behalf of the merchants 916, the service provider can maintain accounts or balances for the merchants 916 in one or more ledgers. For example, the service provider can analyze transaction data received for a transaction to determine an amount of funds owed to a merchant 916(A) for the transaction. In at least one example, such an amount can be a total purchase price less fees charged by the service provider for providing the payment processing services. Based on determining the amount of funds owed to the merchant 916(A), the service provider can deposit funds into an account of the merchant 916(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 916(A) to a bank account of the merchant 916(A) that is held at a bank or other financial institution (e.g., associated with the server(s) 910). Scheduled deposits can occur at a prearranged time after a POS transaction is funded, which can be a business day after the POS transaction occurred, or sooner or later. In some examples, the merchant 916(A) can access funds prior to a scheduled deposit. For instance, the merchant 916(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 916(A) can have a payment instrument that is linked to the stored balance that enables the merchant to access the funds without first transferring the funds from the account managed by the service provider to the bank account of the merchant 916(A).

In at least one example, the service provider may provide inventory management services. That is, the service provider may provide inventory tracking and reporting. Inventory management services may enable the merchant 916(A) to access and manage a database storing data associated with a quantity of each item that the merchant 916(A) has available (i.e., an inventory). Furthermore, in at least one example, the service provider can provide catalog management services to enable the merchant 916(A) to maintain a catalog, which can be a database storing data associated with items that the merchant 916(A) has available for acquisition (i.e., catalog management services). In at least one example, the catalog may include a plurality of data items and a data item of the plurality of data items may represent an item that the merchant 916(A) has available for acquisition. The service provider can offer recommendations related to pricing of the items, placement of items on the catalog, and multi-party fulfillment of the inventory.

In at least one example, the service provider can provide business banking services, which allow the merchant 916(A) to track deposits (from payment processing and/or other sources of funds) into an account of the merchant 916(A), payroll payments from the account (e.g., payments to employees of the merchant 916(A)), payments to other merchants (e.g., business-to-business) directly from the account or from a linked debit card, withdrawals made via scheduled deposit and/or instant deposit, etc. Furthermore, the business banking services can enable the merchant 916(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 916 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants

916. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 912 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 914 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 916. In at least one example, the service provider can recommend and/or generate content items to supplement omni-channel presences of the merchants 916. That is, if a merchant of the merchants 916 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 914 to set schedules for scheduling appointments and/or users 914 to schedule appointments.

In some examples, the service provider can provide restaurant management services to enable users 914 to make and/or manage reservations, to monitor front-of-house and/or back-of-house operations, and so on. In such examples, the merchant device(s) 908 and/or server(s) 902 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 914 who can travel between locations to perform services for a requesting user 914 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 906.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 914 may be new to the service provider such that the user 914 that has not registered (e.g., subscribed to receive access to one or more services offered by the service provider) with the service provider. The service provider can offer onboarding services for registering a potential user 914 with the service provider. In some examples, onboarding can involve presenting various questions, prompts, and the like to a potential user 914 to obtain information that can be used to generate a profile for the potential user 914. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 914 providing all necessary information, the potential user 914 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 910). That is, the service provider can offer IDV services to verify the identity of users 914 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 914 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 910 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 902) and/or the server(s) 910 via the network(s) 904. In some examples, the merchant device(s) 908 are not capable of connecting with the service provider (e.g., the server(s) 902) and/or the server(s) 910, due to a network connectivity issue, for example. In additional or alternative examples, the server(s)

902 are not capable of communicating with the server(s) 910 due to network connectivity issue, for example. In such examples, devices may operate in "offline" mode where at least some payment data is stored (e.g., on the merchant device(s) 908) and/or the server(s) 902 until connectivity is restored and the payment data can be transmitted to the server(s) 902 and/or the server(s) 910 for processing.

In at least one example, the service provider can be associated with a hub, such as an order hub, an inventory hub, a fulfillment hub and so on, which can enable integration with one or more additional service providers (e.g., associated with the additional server(s) 910). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 906 that are in communication with server(s) 902 of the service provider. That is, techniques described herein are directed to a specific implementation—or, a practical application—of utilizing a distributed system of user devices 906 that are in communication with server(s) 902 of the service provider to perform a variety of services, as described above. The unconventional configuration of the distributed system described herein enables the server(s) 902 that are remotely-located from end-users (e.g., users 914) to intelligently offer services based on aggregated data associated with the end-users, such as the users 914 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs. As such, techniques described herein are directed to improvements to computing systems.

Figure 10:
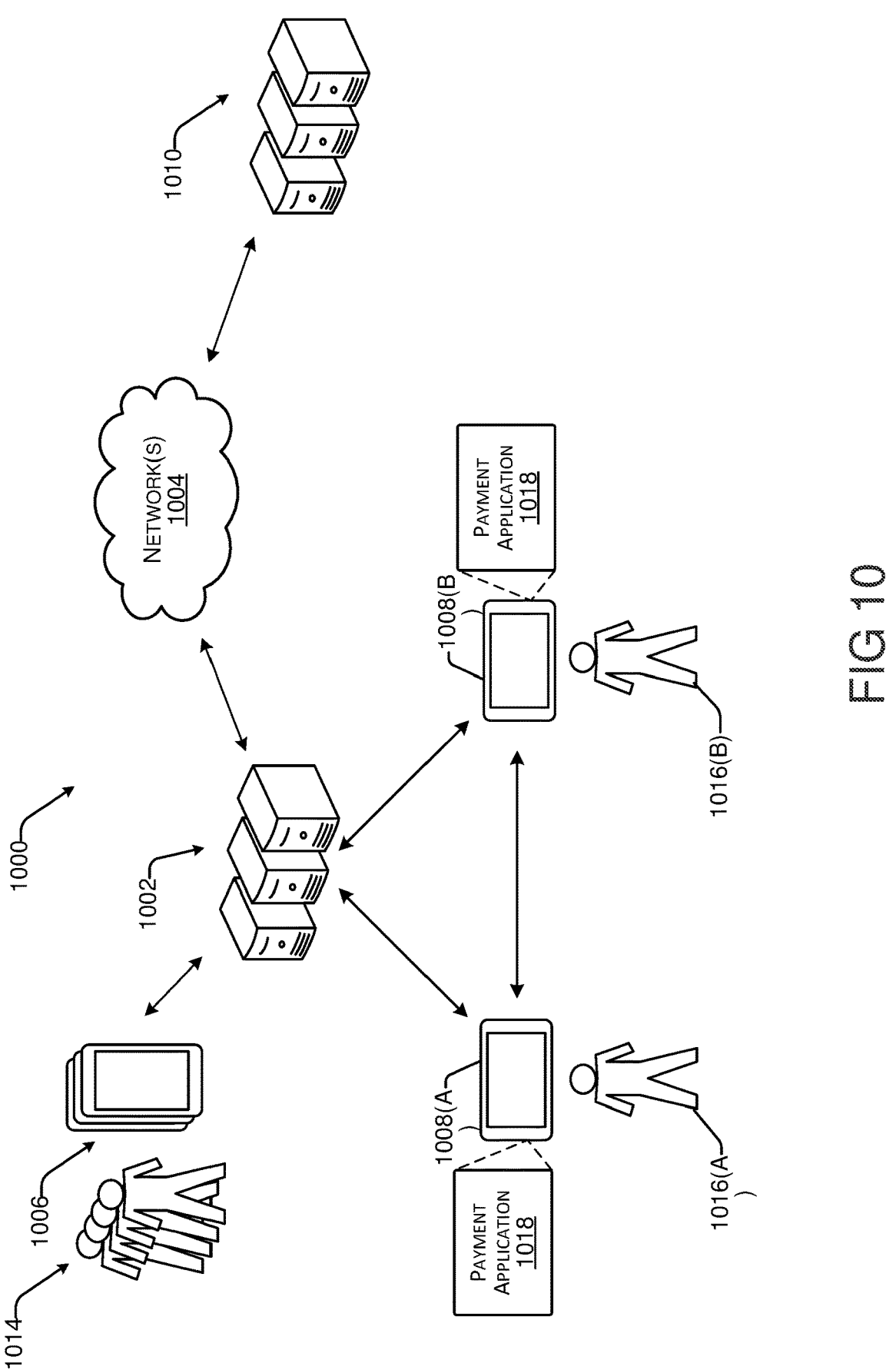
FIG. 10 illustrates an example environment with which techniques described herein may be implemented in accordance with some implementations.

FIG. 10 illustrates an example environment 1000. The environment 1000 includes server(s) 1002 that can communicate over a network 1004 with user devices 1006 (which, in some examples can be user devices 1008 (individually, 1008(A), 1008(B)) and/or server(s) 1010 associated with third-party service provider(s). The server(s) 1002 can be associated with a service provider that can provide one or more services for the benefit of users 1014, as described below. Actions attributed to the service provider can be performed by the server(s) 1002. In some examples, the service provider referenced in FIG. 9 can be the same or different than the service provider referenced in FIG. 10.

In some implementations, the server(s) 1002 and the user devices 1006 may include the decentralized platform 102 of FIG. 1. For example, a user 1014 may be associated with a first decentralized identifier 114a and a server 1002 may be associated with a third decentralized identifier 114c of FIG. 1. In some implementations, the user device 1006 may also include the edge device 202 and the server 1002 may include the decentralized platform 102 of FIG. 2.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In at least one example, the service provider can provide a peer-to-peer payment service that enables peer-to-peer payments between two or more users 1014. Two users, user 1016(A) and user 1016(B) are illustrated in FIG. 10 as "peers" in a peer-to-peer payment. In at least one example, the service provider can communicate with instances of a payment application 1018 (or other access point) installed on devices 1006 configured for operation by users 1014. In an example, an instance of the payment application 1018 executing on a first device 1008(A) operated by a payor (e.g., user 1016(A)) can send a request to the service provider to transfer an asset (e.g., fiat currency, non-fiat currency, digital assets, cryptocurrency, securities, gift cards, and/or related assets) from the payor to a payee (e.g., user 1016(B)) via a peer-to-peer payment. In some examples, assets associated with an account of the payor are transferred to an account of the payee. In some examples, assets can be held at least temporarily in an account of the service provider prior to transferring the assets to the account of the payee.

In some examples, the service provider can utilize a ledger system to track transfers of assets between users 1014. The ledger system can enable users 1014 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1018 executing on user device(s) of payee(s). As an example, the service provider can transfer assets from an account of user 1016(A) to an account of the user 1016(B) and can send a notification to the user device 1008(B) of the user 1016(B) for presentation via a user interface. The notification can indicate that a transfer is in process, a transfer is complete, or the like. In some examples, the service provider can send additional or alternative information to the instances of the payment application 1018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some implementations, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., 13Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar (13), euro (€), pound (£), rupee (Z), yuan (¥), etc. Although use of the dollar currency indicator (13) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1018 executing on the user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/13Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 10 or a third-party service provider associated with the server(s) 1010. In examples where the content provider is a third-party service provider, the server(s) 1010 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some implementations, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 10. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server(s) 1002 (which, in such an example can be called a "messaging server"). In some instances, the messaging application can include a payment application with messaging capability that enables users of the payment application to communicate with one another. In such instances, the payment application can be executed on a user device 1006 based on instructions transmitted to and from the server(s) 1002 (e.g., the payment service discussed in this description or another payment service that supports payment transactions). In some examples, the messaging application can be provided by a third-party service provider associated with the server(s) 1010. In examples where the messaging application is a third-party service provider, the server(s) 1010 can be accessible via one or more APIs or other integrations.

As described above, the service provider can facilitate peer-to-peer transactions, which can enable users 1014 to transfer fiat currency, non-fiat currency, cryptocurrency, securities, or other assets, or portions thereof, to other users 1014. In at least one example, individual users can be associated with user accounts.

Furthermore, the service provider of FIG. 10 can enable users 1014 to perform banking transactions via instances of the payment application 1018. For example, users can configure direct deposits or other deposits for adding assets to their various ledgers/balances. Further, users 1014 can configure bill pay, recurring payments, and/or the like using assets associated with their accounts. In addition to sending and/or receiving assets via peer-to-peer transactions, users 1014 buy and/or sell assets via asset networks such as cryptocurrency networks, securities networks, and/or the like.

FIG. 11 illustrates example data store(s) 1100 that can be associated with the server(s) 1002. In at least one example, the data store(s) 1100 can store assets in an asset storage 1102, as well as data in user account(s) 1104. In some examples, user account(s) 1104 can include merchant account(s) 1106, and/or customer account(s) 1108. In at least one example, the asset storage 1102 can be used to store assets managed by the service provider of FIG. 10. In at least one example, the asset storage 1102 can be used to record whether individual ones of the assets are registered to users. For example, the asset storage 1102 can include an asset wallet 1110 for storing records of assets owned by the service provider of FIG. 10, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 910 can be associated therewith. In some examples, the asset wallet 1110 can communicate with the asset network via one or more components associated with the server(s) 502.

The asset wallet 1110 can be associated with one or more addresses and can vary addresses used to acquire assets (e.g., from the asset network(s)) so that its holdings are represented under a variety of addresses on the asset network. In examples where the service provider of FIG. 10 has its own holdings of cryptocurrency (e.g., in the asset wallet 1110), a user can acquire cryptocurrency directly from the service provider of FIG. 10. In some examples, the service provider of FIG. 10 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider can provide the same or similar functionality for securities or other assets.

The asset storage 1102 may contain ledgers that store records of assignments of assets to users 914. Specifically, the asset storage 1102 may include asset ledger 1110, fiat currency ledger 1114, and other ledger(s) 1116, which can be used to record transfers of assets between users 914 of the service provider and/or one or more third-parties (e.g., merchant network(s), payment card network(s), ACH network(s), equities network(s), the asset network, securities networks, etc.). In doing so, the asset storage 1102 can maintain a running balance of assets managed by the service provider of FIG. 10. The ledger(s) of the asset storage 1102 can further indicate some of the running balance for each of the ledger(s) stored in the asset storage 1102 is assigned or registered to one or more user account(s) 1104.

In at least one example, the asset storage 1102 can include transaction logs 1118, which can include records of past transactions involving the service provider of FIG. 10. In at least one example, transaction data, as described herein, can be stored in association with the transaction logs 1118.

In some examples, the data store(s) 1100 can store a private blockchain 1119. A private blockchain 1119 can function to record sender addresses, recipient addresses, public keys, values of cryptocurrency transferred, and/or can be used to verify ownership of cryptocurrency tokens to be transferred. In some examples, the service provider of FIG. 10 can record transactions taking place within the service provider of FIG. 10 involving cryptocurrency until the number of transactions has exceeded a determined limit (e.g., number of transactions, storage space allocation, etc.). Based at least in part on determining that the limit has been reached, the service provider of FIG. 10 can publish the transactions in the private blockchain 1119 to a public blockchain (e.g., associated with the asset network), where miners can verify the transactions and record the transactions to blocks on the public blockchain. In at least one example, the service provider of FIG. 10 can participate as miner(s) at least for its transactions to be posted to the public blockchain.

In at least one example, the data store(s) 1100 can store and/or manage accounts, such as user account(s) 1104, merchant account(s) 1106, and/or customer account(s) 1108. In at least one example, the user account(s) 1104 may store records of user accounts associated with the users 914. In at least one example, the user account(s) 1104 can include a user account 1120, which can be associated with a user (of the users 914). Other user accounts of the user account(s) 1104 can be similarly structured to the user account 1120, according to some examples. In other examples, other user accounts may include more or less data and/or account information than that provided by the user account 1120. In at least one example, the user account 1120 can include user account data 1128, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1128 can include account activity 1130 and user wallet key(s) 1132. The account activity 1130 may include a transaction log for recording transactions associated with the user account 1120. In some examples, the user wallet key(s) 1132 can include a public-private key-pair and a respective address associated with the asset network or other asset networks. In some examples, the user wallet key(s) 1132 may include one or more key pairs, which can be unique to the asset network or other asset networks.

In addition to the user account data 1128, the user account 1120 can include ledger(s) for account(s) managed by the service provider of FIG. 10, for the user. For example, the user account 1120 may include an asset ledger 1134, a fiat currency ledger 1136, and/or one or more other ledgers 1138. The ledger(s) can indicate that a corresponding user utilizes the service provider of FIG. 10 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual ones of the ledger(s), or portions thereof, can be maintained by the service provider of FIG. 10.

In some examples, the asset ledger 1134 can store a balance for each of one or more cryptocurrencies (e.g., Bitcoin, Ethereum, Litecoin, etc.) registered to the user account 1120. In at least one example, the asset ledger 1134 can further record transactions of cryptocurrency assets associated with the user account 1120. For example, the user account 1120 can receive cryptocurrency from the asset network using the user wallet key(s) 1132. In some examples, the user wallet key(s) 1132 may be generated for the user upon request. User wallet key(s) 1132 can be requested by the user in order to send, exchange, or otherwise control the balance of cryptocurrency held by the service provider of FIG. 10 (e.g., in the asset wallet 1110) and registered to the user. In some examples, the user wallet key(s) 1132 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 10 and the value is credited as a balance in asset ledger 1134), by purchasing currency in the form associated with the account using currency in a different form (e.g., buying a value of cryptocurrency from the service provider of FIG. 10 using a value of fiat currency reflected in fiat currency ledger 1136, and crediting the value of cryptocurrency in asset ledger 1134), or by conducting a transaction with another user (customer or merchant) of the service provider of FIG. 10 wherein the account receives incoming currency (which can be in the form associated with the account or a different form, in which the incoming currency may be converted to the form associated with the account). In some examples, the user account data 1128 can include preferences for maintaining balances of individual ones of the ledgers. For example, the service provider of FIG. 10 can automatically debit the fiat currency ledger 1136 to increase the asset ledger 1134, or another account associated with the user whenever the cryptocurrency balance (e.g., of the asset ledger 1134) falls below a stated level (e.g., a threshold).

Conversely, in some embodiments, the service provider of FIG. 10 can automatically credit the fiat currency ledger 1136 to decrease the asset ledger 1134 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 10 (i.e., an external account). In at least one example, the user can transfer all or a portion of a balance of the cryptocurrency stored in the third-party cryptocurrency wallet to the service provider of FIG. 10. Such a transaction can request that the user to transfer an amount of the cryptocurrency in a message signed by user's private key to an address provided by the service provider of FIG. 10. In at least one example, the transaction can be sent to miners to bundle the transaction into a block of transactions and to verify the authenticity of the transactions in the block. Once a miner has verified the block, the block is written to a public, distributed blockchain where the service provider of FIG. 10 can then verify that the transaction has been confirmed and can credit the user's asset ledger 1134 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 10. As described above, in some examples, the service provider of FIG. 10 can acquire cryptocurrency from a third-party source. In such examples, the asset wallet 1110 can be associated with different addresses and can vary addresses used to acquire cryptocurrency so that its holdings are represented under a variety of addresses on a blockchain. When the service provider of FIG. 10 has their own holdings of cryptocurrency, users can acquire cryptocurrency directly from the service provider of FIG. 10. In some examples, the service provider of FIG. 10 can include logic for buying and selling cryptocurrency in order to maintain a desired level of cryptocurrency. The desired level can be based on a volume of transactions over a period, balances of collective user profiles' cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from customer-merchant transactions, and therefore not necessarily time-sensitive.

In examples where the service provider of FIG. 10 has its own cryptocurrency assets, cryptocurrency transferred in a transaction (e.g., data with address provided for receipt of transaction and a balance of cryptocurrency transferred in the transaction) can be stored in the asset wallet 1110. In at least one example, the service provider of FIG. 10 can credit the asset ledger 1134 of the user. Additionally, while the service provider of FIG. 10 recognizes that the user retains the value of the transferred cryptocurrency through crediting the asset ledger 1134, any person that inspects the blockchain will see the cryptocurrency as having been transferred to the service provider of FIG. 10. In some examples, the asset wallet 1110 can be associated with many different addresses. In such examples, any person that inspects the blockchain may not easily associate all cryptocurrency stored in asset wallet 1110 as belonging to the same entity. It is this presence of a private ledger that is used for real-time transactions and maintained by the service provider of FIG. 10, combined with updates to the public ledger at other times, that allows for extremely fast transactions using cryptocurrency to be achieved. In some examples, the "private ledger" can refer to the asset ledger 1110, which in some examples, can utilize the private blockchain 1119, as described herein. The "public ledger" can correspond to a public blockchain associated with the asset network.

In at least one example, a user's asset ledger 1134, fiat currency ledger 1136, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1134. In some examples, a user can receive fiat currency or another currency in the form of payment for a transaction with another user. In at least one example, at least a portion of such funds can be converted into cryptocurrency by the service provider of FIG. 10 and used to fund the asset ledger 1134 of the user.

As addressed above, in some examples, users can also have other accounts maintained by the service provider of FIG. 10. For example, a user can also have an account in U.S. dollars, which can be tracked, for example, via the fiat currency ledger 1136. Such an account can be funded by transferring money from a bank account at a third-party bank to an account maintained by the service provider of FIG. 10 as is conventionally known. In some examples, a user can receive fiat currency in the form of payment for a transaction with another user. In such examples, at least a portion of such funds can be used to fund the fiat currency ledger 1136.

In some examples, a user can have one or more internal payment cards registered with the service provider of FIG. 10. Internal payment cards can be linked to one or more of the accounts associated with the user account 1120. In some embodiments, options with respect to internal payment cards can be adjusted and managed using an application (e.g., the payment application 1018).

In at least one example, as described above, each ledger can correspond to an account of the user that is managed by the service provider of FIG. 10. In at least one example, individual ones of the accounts can be associated with a wallet or a stored balance for use in payment transactions, peer-to-peer transactions, payroll payments, etc.

In at least one example, the user account 1120 can be associated with an asset wallet 1140. The asset wallet 1140 of the user can be associated with account information that can be stored in the user account data 1128 and, in some examples, can be associated with the user wallet key(s) 1132. In at least one example, the asset wallet 1140 can store data indicating an address provided for receipt of a cryptocurrency transaction. In at least one example, the balance of the asset wallet 1140 can be based at least in part on a balance of the asset ledger 1134. In at least one example, funds availed via the asset wallet 1140 can be stored in the asset wallet 1140 or the asset wallet 1110. Funds availed via the asset wallet 1110 can be tracked via the asset ledger

1134. The asset wallet 1140, however, can be associated with additional cryptocurrency funds.

In at least one example, when the service provider of FIG. 10 includes a private blockchain 1119 for recording and validating cryptocurrency transactions, the asset wallet 1140 can be used instead of, or in addition to, the asset ledger 1134. For example, at least one example, a merchant can provide the address of the asset wallet 1140 for receiving payments. In an example where a customer is paying in cryptocurrency and the customer has their own cryptocurrency wallet account associated with the service provider of FIG. 10, the customer can send a message signed by its private key including its wallet address (i.e., of the customer) and identifying the cryptocurrency and value to be transferred to the merchant's asset wallet 1140. The service provider of FIG. 10 can complete the transaction by reducing the cryptocurrency balance in the customer's cryptocurrency wallet and increasing the cryptocurrency balance in the merchant's asset wallet 1140. In addition to recording the transaction in the respective cryptocurrency wallets, the transaction can be recorded in the private blockchain 1119 and the transaction can be confirmed. A user can perform a similar transaction with cryptocurrency in a peer-to-peer transaction as described above. In at least one example, the cryptocurrency wallet account 1130 can be funded by a balance transfer from a third-party cryptocurrency wallet, as described above. Such a transaction can include requesting a user to transfer an amount of cryptocurrency in a message signed by the user's private key to an address of the cryptocurrency wallet account 1130. The transferred amount of cryptocurrency can then be within the cryptocurrency wallet account 1130 for use in later transactions.

While the asset ledger 1134 and/or asset wallet 1140 are each described above with reference to cryptocurrency, the asset ledger 1134 and/or asset wallet 1140 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 10 is an aspect of the technology disclosed that enables technical advantages of increased processing speed and improved security.

Figure 12:
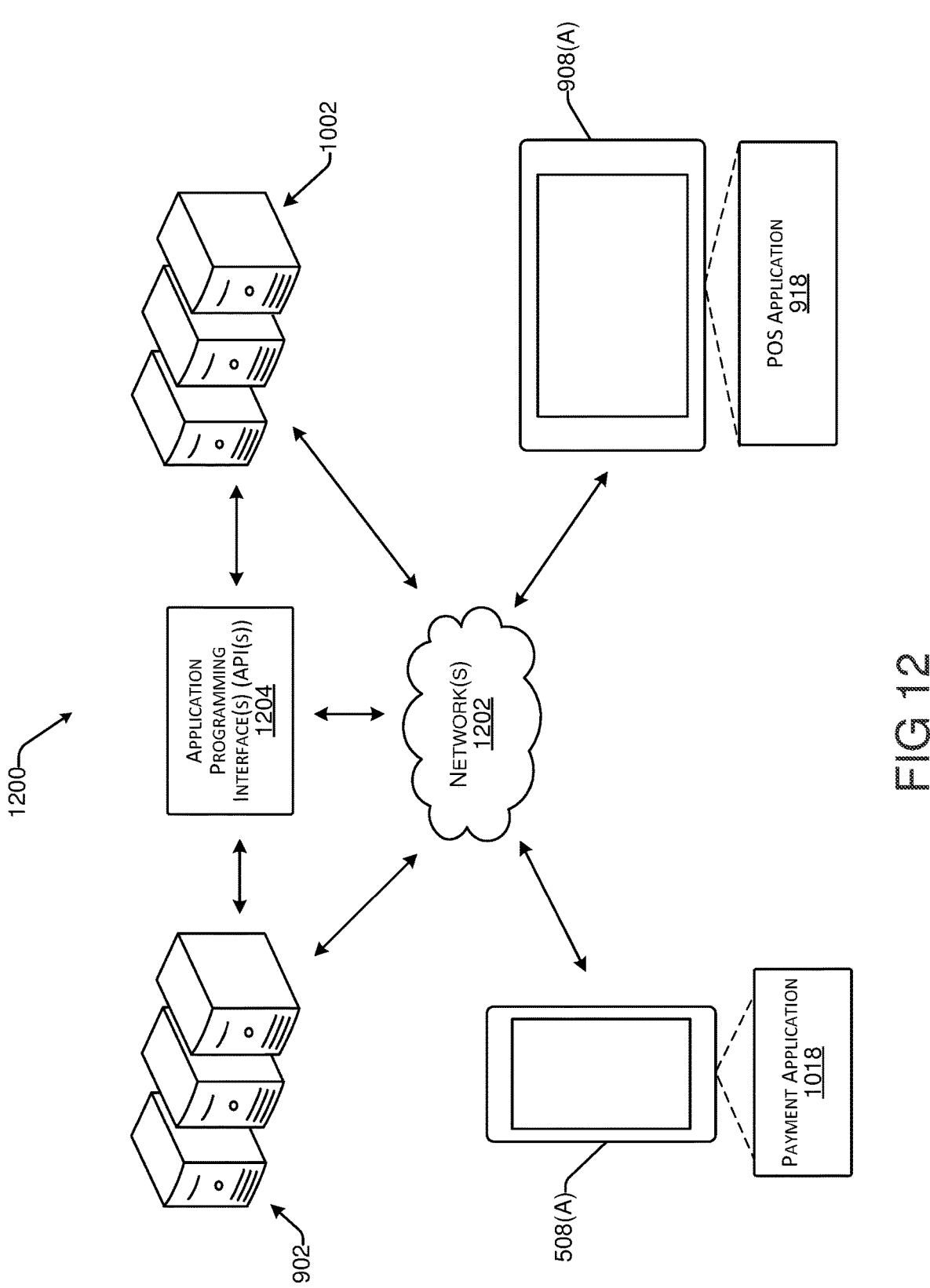
FIG. 12 illustrates an example environment in which the environments of FIGS. 9 and 10 can be integrated to enable payments at the point-of-sale using assets associated with user accounts in the peer-to-peer environment of FIG. 11 with which techniques described herein may be implemented in accordance with some implementations.

FIG. 12 illustrates an example environment 1200 wherein the environment 900 and the environment 1000 can be integrated to enable payments at the point-of-sale using assets associated with user accounts in the peer-to-peer environment of FIG. 9. As illustrated, each of the components can communicate with one another via one or more networks 1202. In some examples, one or more APIs 1204 or other functional components can be used to facilitate such communication.

In at least one example, the example environment 1200 can enable contactless payments, via integration of peer-to-peer payment, or other payment making, platform(s) and payment processing platform(s), are described herein. For the purpose of FIG. 12, the environment 900 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 908(A). In such an example, the POS application 918, associated with a payment processing platform and executable by the merchant device 908(A) of the merchant, can present a Quick Response (QR) code, or other code that can be used to identify a transaction (e.g., a transaction code), in association with a transaction between the customer and the merchant. The QR code, or other transaction code, can be provided to the POS application 918 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 902 and/or server(s) 1002.

Based at least in part on the integration of the peer-to-peer payment platform and the payment processing platform (e.g., via the API), the server(s) 902 and/or 1002 associated with each can exchange communications with each other— and with a payment application 1018 associated with the peer-to-peer payment platform and/or the POS application 918—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 918 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 908(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 918 can cause a text message with a resource locator (e.g., uniform resource locator (URL)) that can be associated with a peer-to-peer payment platform to be sent to the user device 1008(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1008 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 918 of a merchant device 908(A) at a brick-and-mortar store of a merchant to a payment application 1018 of a user device 1008(A) of a customer to enable the customer to participate in a transaction via their own computing device. For instance, in a "scan to pay" example as described above, based at least in part on capturing the QR code, or other transaction code, via the user device 1008(A), the payment processing platform can provide transaction data to the peer-to-peer payment platform for presentation via the payment application 1018 on the user device 1008(A). In some examples, the customer can watch items being added to their cart (e.g., via a user interface presented via the payment application). As an item is added to a virtual cart by the merchant—via the POS application 918 on the merchant device 908(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based at least in part on capturing the QR code, or other transaction code, the payment processing platform can provide transaction data to the peer-to-peer payment platform for presentation via the payment application 1018 on the computing device of the customer, such as the user device 1008(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via an interaction with the user interface. In another example, the payment processing platform can adjust a total amount of a transaction based on events during a shopping experience, such as adding or removing a charge to the total amount based on whether a media content item requested by the customer to be played during a shopping experience was in fact played. In some examples, because the customer has already authorized payment via the peer-to-peer payment platform, if the customer inputs a tip and/or an event affecting the total amount of the transaction is triggered, the peer-to-peer payment platform can transfer additional funds, associated with the tip or event, to the payment processing platform. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, play media content, or the like without being watched by the merchant or other customers.

In some examples, such as when the QR code, or other transaction code, is captured by the computing device of the customer prior to a payment selection user interface being presented via the POS application 918, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1018 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

FIG. 13 depicts an illustrative block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 9 and FIG. 13.

In some implementations, the user device 1302 can be the edge device 202 and the server(s) 1304 can be the decentralized platform 102 of FIG. 2.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1315, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a user interface 1320 to enable users to interact with the user device 1302, and thus the server(s) 1304 and/or other networked devices. In at least one example, the user interface 1320 can be presented via a web browser, or the like. In other examples, the user interface 1320 can be presented via an application, such as a mobile application or desktop application, which can be provided by a service provider associated with the server(s) 1304, or which can be an otherwise dedicated application. In some examples, the user interface 1320 can be interface 405. In at least one example, a user can interact with the user interface via touch input, spoken input, gesture, or any other type of input. The word "input" is also used to describe "contextual" input that may not be directly provided by the user via the user interface 1320. For example, user's interactions with the user interface 1320 are analyzed using, e.g., natural language processing techniques, to determine context or intent of the user, which may be treated in a manner similar to "direct" user input.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1315. The I/O devices 1315 can include speakers, a microphone, a camera, and various user controls (e.g., buttons, a joystick, a keyboard, a keypad, etc.), a haptic output device, and so forth. The I/O devices 1315 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a global positioning system (GPS) device able to indicate location information. Further, the sensor(s) 1318 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 914 entering a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the payment service and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1528 and that, when executed, specifically configure the one or more processors 1328 to perform the actions attributed above to the service provider and/or payment processing service. Functional components stored in the computer-readable media 1330 can optionally include a merchant component 1336, a training component 1338, and one or more other components and data 1340.

The merchant component 1336 can be configured to receive transaction data from POS systems, such as the POS system 1224 described above with reference to FIG. 12. The merchant component 1336 can transmit requests (e.g., authorization, capture, settlement, etc.) to payment service server computing device(s) to facilitate POS transactions between merchants and customers. The merchant component 1336 can communicate the successes or failures of the POS transactions to the POS systems.

The training component 1338 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1502 and/or the server(s) 1304 for use at a time after the data models have been trained (e.g., at runtime).

The one or more other components and data 1340 can include the node manager module 120, the functionality of which is described, at least partially, above. Further, the one or more other components and data 1340 can include programs, drivers, etc., and the data used or generated by the functional components. Further, the server(s) 1304 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 15, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

Example Clauses

Clause 1. A computer-implemented method comprising: requesting, by a first decentralized identifier (DID) associated with a decentralized web node (DWN), a verifiable credential from a second DID, wherein the second DID is included in a pool of DIDs; receiving, from the pool of DIDs and by the first DID, the verifiable credential, the verifiable credential indicating the pool of DIDs as an issuer without indicating the second DID; storing the verifiable credential in the DWN associated with the first DID; receiving, from a third DID and at the first DID, a request to verify information associated with the first DID; determining, at the DWN, that the verifiable credential includes the information requested by the third DID; and presenting, by the DWN, at least a portion of the verifiable credential to the third DID in response to determining that the verifiable credential includes the information.

Clause 2. The subject matter of any preceding clause, wherein the verifiable credential includes a trustworthiness score that reflects a trustworthiness associated with the pool of DIDs.

Clause 3. The subject matter of any preceding clause, the method further comprising: receiving, at the DWN, one or more requests for information from the third DID, wherein the one or more requests for additional information are based on the trustworthiness score associated with the pool of DIDs; and providing, by the DWN, responses to the one or more requests to the third DID, wherein access to a service provided by the third DID is granted based on the responses.

Clause 4. The subject matter of any preceding clause, wherein the pool of DIDs is associated with a first tier that is based on the trustworthiness score meeting a threshold score value and wherein a second tier is associated with the trustworthiness score falling below the threshold score value.

Clause 5. The subject matter of any preceding clause, further comprising: providing, by the first DID, multiple electronic documents to the second DID to authenticate the first DID; wherein the first DID receives the verifiable credential from the pool of DIDs that is associated with the first tier based on a respective type of the multiple electronic documents or a number of the multiple electronic documents provided to the second DID.

Clause 6. The subject matter of any preceding clause, wherein the trustworthiness score is included in a DID document associated with the second DID.

Clause 7. The subject matter of any preceding clause, wherein the pool of DIDs include DIDs selected from one or more of geographically disparate locations, DIDs with different sizes, based on different private finance initiatives (PFIs), different types of DIDs, and combinations thereof.

Clause 8. The subject matter of any preceding clause, the method further comprising: providing, by the first DID, access control rules that describe the portion of the verifiable credential to be presented by the DWN to the third DID.

Clause 9. A server associated with a decentralized web node (DWN), the server comprising: one or more processing devices; and a computer-readable storage medium, with instructions stored thereon that, responsive to execution by the one or more processing devices, cause the one or more processing devices to perform operations including: receiving, from a first decentralized identifier (DID) and at a second DID, a request for access to a service provided by the second DID; providing, to the first DID, a request to verify information associated with the first DID, the information being from a verifiable credential that was issued by a pool of multiple DIDs, the pool of multiple DIDs including a third DID that is unidentifiable from the information; receiving at least a portion of the verifiable credential; and using the at least the portion of the verifiable credential to satisfy the request for access to the service.

Clause 10. The subject matter of any preceding clause, wherein the at least the portion of the verifiable credential includes a trustworthiness score that reflects a trustworthiness associated with the pool of multiple DIDs and using the at least the portion of the verifiable credential to satisfy the request for access to the service is based on the trustworthiness score meeting a threshold score value.

Clause 11. The subject matter of any preceding clause, wherein the at least the portion of the verifiable credential includes a trustworthiness score that reflects a trustworthiness associated with the pool of multiple DIDs, the pool of multiple DIDs is associated with a first tier that is based on the trustworthiness score meeting a threshold score value, and a second tier is associated with the trustworthiness score falling below the threshold score value.

Clause 12. The subject matter of any preceding clause, wherein the operations further include: providing, by the third DID, one or more requests for additional information for the first DID, wherein the one or more requests for the additional information are based on the trustworthiness score associated with the pool of DIDs; and receiving, from the DWN, responses to the one or more requests, wherein access to the service is granted based on the responses.

Clause 13. The subject matter of any preceding clause, wherein the pool of multiple DIDs includes multiple DIDs selected from one or more of geographically disparate locations, DIDs with different sizes, based on different private finance initiatives (PFIs), different types of DIDs, and combinations thereof.

Clause 14. A non-transitory computer-readable medium with instructions stored thereon that, when executed by one or more processors at a device, cause the one or more processors to perform operations, the operations comprising: receiving, from a first decentralized identifier (DID) associated with a decentralized web node (DWN) and by a second DID, a request for a verifiable credential; joining, by the second DID, a pool of multiple DIDs that collectively issue verifiable credentials from the pool without indicating which of the multiple DIDs in the pool received respective requests; and providing, by the pool of multiple DIDs and to the first DID, the verifiable credential; wherein the first DID presents at least a portion of the verifiable credential to a third DID upon request from the third DID.

Clause 15. The subject matter of any preceding clause, wherein the operations further include receiving a recommendation to join the pool of multiple DIDs based on the second DID having a DID document with characteristics that match the pool of multiple DIDs.

Clause 16. The subject matter of any preceding clause, wherein the operations further comprise: generating a trustworthiness score for the pool of multiple DIDs based on a type of the pool of multiple DIDs; and assigning the pool of multiple DIDs to a first tier based on the trustworthiness score meeting a threshold score value; wherein a second tier is associated with the trustworthiness score falling below the threshold score value.

Clause 17. The subject matter of any preceding clause, wherein the verifiable credential includes the trustworthiness score.

Clause 18. The subject matter of any preceding clause, the request for the verifiable credential includes one or more electronic documents that identify the first DID; and the pool of DIDs provide the verifiable credential to the first DID based on a type of the one or more electronic documents or a number of the one or more electronic documents provided to the second DID.

Clause 19. The subject matter of any preceding clause, wherein the operations further comprise selecting DIDs for the pool of multiple DIDs from one or more of geographically disparate locations, DIDs with different sizes, based on different private finance initiatives (PFIs), different types of DIDs, and combinations thereof.

Clause 20. The subject matter of any preceding clause, wherein joining the pool of multiple DIDs includes providing an acceptance of a collection of rules related to issuance of verifiable credential.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above may be embodied in, and fully or partially automated via, software code modules executed by one or more general purpose computers or processors. The code modules may be stored in any type of computer-readable storage medium or other computer storage device. Some or all of the methods may additionally or alternatively be embodied in specialized computer hardware.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some implementations, one or more blocks of the process can be omitted entirely. Moreover, the methods can be combined in whole or in part with each other or with other methods.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method comprising:
requesting, by a first decentralized identifier (DID) associated with a decentralized web node (DWN), a verifiable credential from a second DID, wherein the second DID is included in a pool of DIDs;

receiving, from the pool of DIDs and by the first DID, the verifiable credential, the verifiable credential indicating the pool of DIDs as an issuer without indicating the second DID, wherein the verifiable credential includes a trustworthiness score that is issued by a governing body and that reflects a trustworthiness associated with the pool of DIDs, wherein the pool of DIDs is associated with a first tier of a plurality of tiers, and wherein the trustworthiness score is inversely proportional to a tier number of a corresponding tier;

storing the verifiable credential in the DWN associated with the first DID;

receiving, from a third DID and at the first DID, a request to verify information associated with the first DID;

determining, at the DWN, that the verifiable credential includes the information associated with the first DID; and presenting, by the DWN, at least a portion of the verifiable credential to the third DID in response to determining that the verifiable credential includes the information.

2. The method of claim 1, wherein the governing body that issued the trustworthiness score is a government agency.

3. The method of claim 1, further comprising:

receiving, at the DWN, one or more requests for additional information from the third DID, wherein the one or more requests for additional information are based on the trustworthiness score associated with the pool of DIDs falling below a threshold score value; and providing, by the DWN, responses to the one or more requests to the third DID, wherein access to a service provided by the third DID is granted based on the responses.

4. The method of claim 1, wherein the pool of DIDs is a first pool of DIDs, the trustworthiness score is a first trustworthiness score, a second pool of DIDs is associated with a second trustworthiness score and a second tier of the plurality of tiers, and the second trustworthiness score is lower than the first trustworthiness score.

5. The method of claim 4, further comprising:

providing, by the first DID, multiple electronic documents to the second DID to authenticate the first DID;

wherein the first DID receives the verifiable credential from the pool of DIDs that is associated with the first tier based on a respective type of the multiple electronic documents or a number of the multiple electronic documents provided to the second DID.

6. The method of claim 1, wherein the trustworthiness score is included in a DID document associated with the second DID.

7. The method of claim 1, wherein the pool of DIDs includes DIDs selected from one or more of geographically disparate locations, DIDs with different sizes, based on different private finance initiatives (PFIs), different types of DIDs, and combinations thereof.

8. The method of claim 1, further comprising:

providing, by the first DID, access control rules that describe the portion of the verifiable credential to be presented by the DWN to the third DID.

9. A computing device comprising:

one or more processing devices; and a computer-readable storage medium coupled to the one or more processing devices and storing instructions that, responsive to execution by the one or more processing devices, cause the one or more processing devices to perform operations including:

requesting, by a first decentralized identifier (DID) associated with a decentralized web node (DWN), a verifiable credential from a second DID, wherein the second DID is included in a pool of DIDs;

receiving, from the pool of DIDs and by the first DID, the verifiable credential, the verifiable credential indicating the pool of DIDs as an issuer without indicating the second DID, wherein the verifiable credential includes a trustworthiness score that is issued by a governing body and that reflects a trustworthiness associated with the pool of DIDs, wherein the pool of DIDs is associated with a first tier of a plurality of tiers, and wherein the trustworthiness score is inversely proportional to a tier number of a corresponding tier;

storing the verifiable credential in the DWN associated with the first DID;

receiving, from a third DID and at the first DID, a request to verify information associated with the first DID;

determining, at the DWN, that the verifiable credential includes the information associated with the first DID; and presenting, by the DWN, at least a portion of the verifiable credential to the third DID in response to determining that the verifiable credential includes the information.

10. The computing device of claim 9, wherein the governing body that issued the trustworthiness score is a government agency.

11. The computing device of claim 9, wherein the operations further include:

receiving, at the DWN, one or more requests for additional information from the third DID, wherein the one or more requests for additional information are based on the trustworthiness score associated with the pool of DIDs falling below a threshold score value; and providing, by the DWN, responses to the one or more requests to the third DID, wherein access to a service provided by the third DID is granted based on the responses.

12. The computing device of claim 9, wherein the pool of DIDs is associated with a first tier that is based on the trustworthiness score meeting a threshold score value and wherein a second tier is associated with the trustworthiness score falling below the threshold score value.

13. The computing device of claim 12, wherein the operations further include:

providing, by the first DID, multiple electronic documents to the second DID to authenticate the first DID;

wherein the first DID receives the verifiable credential from the pool of DIDs that is associated with the first tier based on a respective type of the multiple electronic documents or a number of the multiple electronic documents provided to the second DID.

14. The computing device of claim 9, wherein the trustworthiness score is included in a DID document associated with the second DID.

15. The computing device of claim 9, wherein the pool of DIDs includes DIDs selected from one or more of geographically disparate locations, DIDs with different sizes, based on different private finance initiatives (PFIs), different types of DIDs, and combinations thereof.

16. A non-transitory computer-readable medium with instructions stored thereon that, responsive to execution by one or more processing devices, cause the one or more processing devices to perform or control performance of operations comprising:

requesting, by a first decentralized identifier (DID) associated with a decentralized web node (DWN), a verifiable credential from a second DID, wherein the second DID is included in a pool of DIDs;

receiving, from the pool of DIDs and by the first DID, the verifiable credential, the verifiable credential indicating the pool of DIDs as an issuer without indicating the second DID, wherein the verifiable credential includes a trustworthiness score that is issued by a governing body and that reflects a trustworthiness associated with the pool of DIDs, wherein the pool of DIDs is associated with a first tier of a plurality of tiers, and wherein the trustworthiness score is inversely proportional to a tier number of a corresponding tier;

storing the verifiable credential in the DWN associated with the first DID;

receiving, from a third DID and at the first DID, a request to verify information associated with the first DID;

determining, at the DWN, that the verifiable credential includes the information associated with the first DID; and presenting, by the DWN, at least a portion of the verifiable credential to the third DID in response to determining that the verifiable credential includes the information.

17. The computer-readable medium of claim 16, wherein the governing body that issued the trustworthiness score is a government agency.

18. The computer-readable medium of claim 16, wherein the operations further include:

receiving, at the DWN, one or more requests for additional information from the third DID, wherein the one or more requests for additional information are based on the trustworthiness score associated with the pool of DIDs falling below a threshold score value; and providing, by the DWN, responses to the one or more requests to the third DID, wherein access to a service provided by the third DID is granted based on the responses.

19. The computer-readable medium of claim 16, wherein the pool of DIDs is associated with a first tier that is based on the trustworthiness score meeting a threshold score value and wherein a second tier is associated with the trustworthiness score falling below the threshold score value.

20. The computer-readable medium of claim 19, wherein the operations further include:

providing, by the first DID, multiple electronic documents to the second DID to authenticate the first DID;

wherein the first DID receives the verifiable credential from the pool of DIDs that is associated with the first tier based on a respective type of the multiple electronic documents or a number of the multiple electronic documents provided to the second DID.

* * * * *